US011678332B2

(12) United States Patent
Akkarakaran et al.

(10) Patent No.: US 11,678,332 B2
(45) Date of Patent: Jun. 13, 2023

(54) CONTROL AND DATA MULTIPLEXING IN UPLINK WIRELESS TRANSMISSIONS

(71) Applicant: QUALCOMM Incorporated, San Diego, CA (US)

(72) Inventors: Sony Akkarakaran, Poway, CA (US); Peter Gaal, San Diego, CA (US); Tao Luo, San Diego, CA (US); Yi Huang, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 16/105,813

(22) Filed: Aug. 20, 2018

(65) Prior Publication Data

US 2019/0069321 A1    Feb. 28, 2019

Related U.S. Application Data

(60) Provisional application No. 62/548,960, filed on Aug. 22, 2017.

(51) Int. Cl.
*H04W 72/23* (2023.01)
*H04L 1/1607* (2023.01)
(Continued)

(52) U.S. Cl.
CPC ........... *H04W 72/23* (2023.01); *H04L 1/1664* (2013.01); *H04L 1/1861* (2013.01);
(Continued)

(58) Field of Classification Search
CPC ............ H04W 72/14; H04W 72/1284; H04W 72/23; H04W 72/21; H04L 1/1664;
(Continued)

(56) References Cited

U.S. PATENT DOCUMENTS 7,774,686 B2    8/2010  Ahn et al.
8,769,365 B2    7/2014  Buckley et al.
(Continued)

FOREIGN PATENT DOCUMENTS

CN    106257856 A    12/2016
EP    3094030 A1    11/2016
(Continued)

OTHER PUBLICATIONS

Partial International Search Report—PCT/US2018/047304—ISA/EPO—dated Nov. 29, 2018.
(Continued)

*Primary Examiner* — Chirag G Shah
*Assistant Examiner* — Joshua Smith
(74) *Attorney, Agent, or Firm* — Kevin Donnelly

(57) ABSTRACT

Methods, systems, and devices for wireless communications are described that support control and data multiplexing in uplink wireless transmissions. Described techniques provide for efficient communication of uplink control information (UCI) through rate-matching uplink data around uplink control information in uplink transmissions, including information on amounts or types of UCI to be transmitted by a UE, indications in downlink transmissions of allocated UCI resources and whether associated UCI is to be included in allocated UCI resources, formatting and multiplexing of multiple wireless services at the UE, or any combination thereof.

10 Claims, 21 Drawing Sheets

(51) Int. Cl.
    *H04L 5/00*          (2006.01)
    *H04L 1/1829*    (2023.01)
    *H04W 72/21*     (2023.01)

(52) U.S. Cl.
    CPC .......... *H04L 5/0057* (2013.01); *H04L 5/0091* (2013.01); *H04W 72/21* (2023.01); *H04L 5/0055* (2013.01)

(58) Field of Classification Search
    CPC ... H04L 1/1861; H04L 5/0057; H04L 5/0091; H04L 5/0055; H04L 5/001; H04L 5/0023; H04L 5/14
    See application file for complete search history.

(56) References Cited

U.S. PATENT DOCUMENTS

| | | | |
|---|---|---|---|
| 8,792,427 B2 | 7/2014 | Damnjanovic et al. | |
| 8,830,883 B2 | 9/2014 | Chen et al. | |
| 9,007,988 B2 | 4/2015 | Shen et al. | |
| 9,060,283 B2 | 6/2015 | Ko et al. | |
| 9,722,735 B2* | 8/2017 | Shin | H04W 72/02 |
| 9,949,275 B2 | 4/2018 | Chen et al. | |
| 2002/0027918 A1* | 3/2002 | Burmeister | H04L 69/04 370/394 |
| 2005/0111452 A1* | 5/2005 | Mamillapalli | H04L 12/56 370/390 |
| 2006/0034247 A1* | 2/2006 | Gu | H04L 1/1628 370/349 |
| 2006/0179387 A1* | 8/2006 | Taffin | H03M 13/2957 714/746 |
| 2007/0248107 A1* | 10/2007 | Iwazaki | H04L 47/10 370/401 |
| 2008/0045185 A1* | 2/2008 | Lee | H04L 43/0876 455/412.2 |
| 2009/0089849 A1* | 4/2009 | Jefremov | H04N 21/4223 725/118 |
| 2009/0129317 A1 | 5/2009 | Che et al. | |
| 2010/0111024 A1* | 5/2010 | Fan | H04L 1/1854 370/329 |
| 2011/0041024 A1* | 2/2011 | Burbidge | H04L 1/1621 714/749 |
| 2011/0128942 A1* | 6/2011 | Kim | H04L 5/0057 370/336 |
| 2011/0243066 A1* | 10/2011 | Nayeb Nazar | H04L 5/0016 370/328 |
| 2011/0243088 A1* | 10/2011 | Ahn | H04L 1/0091 370/329 |
| 2011/0274059 A1* | 11/2011 | Brown | H04L 27/0008 370/329 |
| 2011/0310986 A1* | 12/2011 | Heo | H04W 76/27 375/259 |
| 2012/0207111 A1 | 8/2012 | Jang et al. | |
| 2012/0320805 A1* | 12/2012 | Yang | H04L 1/18 370/280 |
| 2013/0223299 A1* | 8/2013 | Yang | H04L 5/0094 370/280 |
| 2014/0233419 A1* | 8/2014 | Cheng | H04L 1/0031 370/252 |
| 2015/0237619 A1* | 8/2015 | Yang | H04W 72/0413 370/280 |
| 2015/0319064 A1* | 11/2015 | Oishi | H04L 1/203 370/241.1 |
| 2015/0359029 A1 | 12/2015 | Seo et al. | |
| 2016/0330630 A1 | 11/2016 | Yoo et al. | |
| 2017/0311189 A1* | 10/2017 | Almalfouh | H04W 24/08 |
| 2018/0139026 A1* | 5/2018 | Ahn | H04L 1/1671 |
| 2018/0205525 A1* | 7/2018 | He | H04L 5/0055 |
| 2018/0310298 A1* | 10/2018 | Li | H04W 72/0413 |
| 2018/0323907 A1* | 11/2018 | Takeda | H04L 1/1812 |
| 2019/0141696 A1* | 5/2019 | Kim | H04L 5/1469 |
| 2021/0092756 A1* | 3/2021 | Takeda | H04W 72/1284 |

FOREIGN PATENT DOCUMENTS

| | | |
|---|---|---|
| JP | 2016077019 A | 5/2016 |
| WO | WO-2010129619 A2 | 11/2010 |
| WO | WO-2012068141 A1 | 5/2012 |
| WO | WO-2015050743 A1 | 4/2015 |
| WO | WO2017059829 A2 | 4/2017 |

OTHER PUBLICATIONS

Intel Corporation: "HARQ-ACK Feedback for CA with up to 32 CCs," 3GPP Draft; R1-152625_FINAL, 3rd Generation Partnership Project (3GPP), Mobile Competence Centre; 650, Route Des Lucioles; F-06921 Sophia-Antipolis Cedex; France, vol. RAN WG1, No. Fukuoka, Japan; May 25, 2015-May 29, 2015, May 24, 2015, XP050973841, 4 pages, Retrieved from the Internet: URL: http://www.3gpp.org/ftp/Meetings_3GPP_SYNC/RAN1/Docs/ [retrieved on May 24, 2015].
International Search Report and Written Opinion—PCT/US2018/047304—ISA/EPO—dated Feb. 12, 2019.
TD Tech: "Use of UL-Index in UL Grant for A/N Multiplexing in PUSCH in TDD," 3GPP Draft; R1-082350, 3rd Generation Partnership Project (3GPP), Mobile Competence Centre; 650, Route Des Lucioles; F-06921 Sophia-Antipolis Cedex; France, vol. RAN WG1, No. Warsaw, Poland; Jun. 25, 2008, Jun. 25, 2008, XP050110642, 5 pages, [retrieved on Jun. 25, 2008].
Taiwan Search Report—TW107129111—TIPO—dated Feb. 9, 2022.
Qualcomm Incorporated: "Summary of Remaining Issues for UCI Piggyback on PUSCH", 3GPP TSG RAN WG1 Meeting 90bis, R1-1718931, Prague, CZ, Oct. 9-13, 2017, pp. 1-3.
Taiwan Search Report—TW107129111—TIPO—dated Jul. 27, 2022.
TD Tech: "ACK/NACK Multiplexing in PUSCH in TDD", R1-081339, 3rd Generation Partnership Project, Mobile Competence Centre, 650, Route Des Lucioies, F-06921 Sophia-Antipolis Cedex, France, vol. RAN WG1, No. Shenzhen, China, Mar. 26, 2008, Mar. 26, 2008, XP050109764, 3 pages.
VIVO: "Discussion on UCI Piggyback to PUSCH", 3GPP TSG RAN WG1 90 Meeting, 3GPP Draft, R1-1712859_Discussion on UCI Piggyback to PUSCH, 3rd Generation Partnership Project (3GPP), Mobile Competence Centre, 650, Route Des Lucioies, F-06921 Sophia-Antipolis Cedex, France, vol. RAN WG1, No. Prague, P.R. Czechia, Aug. 21, 2017-Aug. 25, 2017, Aug. 20, 2017, XP051315671, 3 Pages, Section 2.1, par. 1, p. 1, Proposal 1, Section 2.2, par. 1, pp. 1 and 2.
European Search Report—EP22213416—Search Authority—The Hague—dated Feb. 17, 2023.

* cited by examiner

- DL Grant
- DL Data Transmission
- UL Grant (w/ optional DAI)
- UL Transmission

CONTROL AND DATA MULTIPLEXING IN UPLINK WIRELESS TRANSMISSIONS

CROSS REFERENCES

The present Application for Patent claims the benefit of U.S. Provisional Patent Application No. 62/548,960 by Akkarakaran et al., entitled "Control and Data Multiplexing in Uplink Wireless Transmissions," filed Aug. 22, 2017, assigned to the assignee hereof, and expressly incorporated by reference in its entirety.

BACKGROUND

The following relates generally to wireless communication, and more specifically to control and data multiplexing in uplink wireless transmissions.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

Wireless communications systems may include control information that is transmitted between base stations and UEs, which may include downlink control information (DCI) that may be provided from a base station to a UE and that may include information for various downlink and/or uplink transmissions. Control information may also include uplink control information (UCI) transmitted from a UE to a base station, which may include information on the UE, such as, for example, a buffer status report (BSR), channel quality information (CQI), or hybrid acknowledgment repeat request (HARD) acknowledgment/negative-acknowledgment (ACK/NACK) information that indicates whether the UE successfully or unsuccessfully received one or more downlink transmissions from the base station.

SUMMARY

The described techniques relate to improved methods, systems, devices, or apparatuses that support control and data multiplexing in uplink wireless transmissions. Generally, the described techniques provide for efficient communication of uplink control information (UCI) through rate-matching uplink data around uplink control information in uplink transmissions, including information on amounts or types of UCI to be transmitted by a user equipment (UE), indications in downlink transmissions of allocated UCI resources and whether associated UCI is to be included in allocated UCI resources, formatting and multiplexing of multiple wireless services at the UE, or any combination thereof A method of wireless communication is described. The method may include receiving, at a UE, a plurality of downlink transmissions from a base station, receiving, at the UE, an uplink grant associated with an uplink transmission from the UE to the base station, the uplink grant comprising an indication of a number of the plurality of downlink transmissions for which the UE is to transmit feedback information during the uplink transmission, the feedback information indicating successful or unsuccessful receipt of each downlink transmission, generating the feedback information for the plurality of downlink transmissions, and transmitting the uplink transmission to the base station.

An apparatus for wireless communication is described. The apparatus may include means for receiving, at a UE, a plurality of downlink transmissions from a base station, means for receiving, at the UE, an uplink grant associated with an uplink transmission from the UE to the base station, the uplink grant comprising an indication of a number of the plurality of downlink transmissions for which the UE is to transmit feedback information during the uplink transmission, the feedback information indicating successful or unsuccessful receipt of each downlink transmission, means for generating the feedback information for the plurality of downlink transmissions, and means for transmitting the uplink transmission to the base station.

Another apparatus for wireless communication is described. The apparatus may include a processor, memory in electronic communication with the processor, and instructions stored in the memory. The instructions may be operable to cause the processor to receive, at a UE, a plurality of downlink transmissions from a base station, receive, at the UE, an uplink grant associated with an uplink transmission from the UE to the base station, the uplink grant comprising an indication of a number of the plurality of downlink transmissions for which the UE is to transmit feedback information during the uplink transmission, the feedback information indicating successful or unsuccessful receipt of each downlink transmission, generate the feedback information for the plurality of downlink transmissions, and transmit the uplink transmission to the base station.

A non-transitory computer readable medium for wireless communication is described. The non-transitory computer-readable medium may include instructions operable to cause a processor to receive, at a UE, a plurality of downlink transmissions from a base station, receive, at the UE, an uplink grant associated with an uplink transmission from the UE to the base station, the uplink grant comprising an indication of a number of the plurality of downlink transmissions for which the UE is to transmit feedback information during the uplink transmission, the feedback information indicating successful or unsuccessful receipt of each downlink transmission, generate the feedback information for the plurality of downlink transmissions, and transmit the uplink transmission to the base station.

In some examples of the method, apparatus, and non-transitory computer-readable medium described above, the indication of the number of the plurality of downlink transmissions may be indicated in a downlink assignment index (DAI) transmitted in the uplink grant. In some examples of the method, apparatus, and non-transitory computer-readable medium described above, the feedback information is transmitted in a physical uplink shared channel (PUSCH) transmission with uplink data from the UE, wherein the uplink data may be rate-matched around the feedback information.

In some examples of the method, apparatus, and non-transitory computer-readable medium described above, the uplink grant further comprises a grant of uplink feedback resources for transmission of feedback information associated with the plurality of downlink transmissions, and wherein the UE further determines whether the uplink feedback resources include resources for each of the plurality of downlink transmissions, and punctures a portion of the uplink transmission that may be outside of the uplink feedback resources with feedback information from at least a first downlink transmission of the plurality of downlink transmissions based at least in part on determining that the uplink feedback resources do not include resources for the first downlink transmission.

Some examples of the method, apparatus, and non-transitory computer-readable medium described above may further include processes, features, means, or instructions for receiving, at the UE prior to receiving the plurality of downlink transmissions, a downlink grant associated with at least a first downlink transmission, the downlink grant comprising an indication of shared channel uplink resources for transmission of feedback information associated with the first downlink transmission, and wherein the transmitting the uplink transmission comprises transmitting the feedback information using the shared channel uplink resources based at least in part on the indication in the downlink grant.

Some examples of the method, apparatus, and non-transitory computer-readable medium described above may further include processes, features, means, or instructions for identifying, at the UE, first UCI associated with a first wireless service, and second UCI associated with a second wireless service, wherein the first UCI and the second UCI may be to be transmitted to the base station in the uplink transmission, and wherein the first UCI may have a first performance reliability parameter and the second UCI may have a second performance reliability parameter that may be different than the first performance reliability parameter. Some examples of the method, apparatus, and non-transitory computer-readable medium described above may further include processes, features, means, or instructions for formatting the first UCI in accordance with the first performance reliability parameter and the second UCI in accordance with the second performance reliability parameter. Some examples of the method, apparatus, and non-transitory computer-readable medium described above may further include processes, features, means, or instructions for multiplexing the formatted first UCI and the formatted second UCI into the uplink transmission.

A method of wireless communication is described. The method may include receiving, at a UE, at least a first downlink transmission from a base station, receiving, at the UE, an uplink grant associated with an uplink transmission from the UE to the base station, the uplink grant comprising an indication of uplink feedback resources for transmission of feedback information associated with at least the first downlink transmission, the feedback information indicating successful or unsuccessful receipt of at least the first downlink transmission, receiving, at the UE, at least a second downlink transmission from the base station, determining whether the uplink feedback resources include resources for feedback information associated with the second downlink transmission, formatting the uplink transmission to include feedback information for one or more of the first downlink transmission or the second downlink transmission based at least in part on the determining, and transmitting the uplink transmission to the base station.

An apparatus for wireless communication is described. The apparatus may include means for receiving, at a UE, at least a first downlink transmission from a base station, means for receiving, at the UE, an uplink grant associated with an uplink transmission from the UE to the base station, the uplink grant comprising an indication of uplink feedback resources for transmission of feedback information associated with at least the first downlink transmission, the feedback information indicating successful or unsuccessful receipt of at least the first downlink transmission, means for receiving, at the UE, at least a second downlink transmission from the base station, means for determining whether the uplink feedback resources include resources for feedback information associated with the second downlink transmission, means for formatting the uplink transmission to include feedback information for one or more of the first downlink transmission or the second downlink transmission based at least in part on the determining, and means for transmitting the uplink transmission to the base station.

Another apparatus for wireless communication is described. The apparatus may include a processor, memory in electronic communication with the processor, and instructions stored in the memory. The instructions may be operable to cause the processor to receive, at a UE, at least a first downlink transmission from a base station, receive, at the UE, an uplink grant associated with an uplink transmission from the UE to the base station, the uplink grant comprising an indication of uplink feedback resources for transmission of feedback information associated with at least the first downlink transmission, the feedback information indicating successful or unsuccessful receipt of at least the first downlink transmission, receive, at the UE, at least a second downlink transmission from the base station, determine whether the uplink feedback resources include resources for feedback information associated with the second downlink transmission, format the uplink transmission to include feedback information for one or more of the first downlink transmission or the second downlink transmission based at least in part on the determining, and transmit the uplink transmission to the base station.

A non-transitory computer readable medium for wireless communication is described. The non-transitory computer-readable medium may include instructions operable to cause a processor to receive, at a UE, at least a first downlink transmission from a base station, receive, at the UE, an uplink grant associated with an uplink transmission from the UE to the base station, the uplink grant comprising an indication of uplink feedback resources for transmission of feedback information associated with at least the first downlink transmission, the feedback information indicating successful or unsuccessful receipt of at least the first downlink transmission, receive, at the UE, at least a second downlink transmission from the base station, determine whether the uplink feedback resources include resources for feedback information associated with the second downlink transmission, format the uplink transmission to include feedback information for one or more of the first downlink transmission or the second downlink transmission based at least in part on the determining, and transmit the uplink transmission to the base station.

In some examples of the method, apparatus, and non-transitory computer-readable medium described above, the determining comprises determining a time difference between receiving the uplink grant and receiving the second downlink transmission, and determining whether the uplink feedback resources include resources for feedback information associated with the second downlink transmission based at least in part on the time difference.

In some examples of the method, apparatus, and non-transitory computer-readable medium described above, the uplink feedback resources may be determined to include resources for feedback information associated with the second downlink transmission when the time difference may be below a threshold value and the uplink feedback resources may be determined not to include resources for feedback information associated with the second downlink transmission when the time difference may be at or above the threshold value. In some examples of the method, apparatus, and non-transitory computer-readable medium described above, the time difference corresponds to a difference in one or more of a number of subframes, a number of slots, a number of symbols, a number of mini-slots, or an absolute time between receiving the uplink grant and receiving the second downlink transmission.

In some examples of the method, apparatus, and non-transitory computer-readable medium described above, the determining comprises identifying an indication in a downlink grant associated with the second downlink transmission that indicates whether the uplink feedback resources include resources for feedback information associated with the second downlink transmission. In some examples of the method, apparatus, and non-transitory computer-readable medium described above, the indication comprises an explicit indication that the uplink feedback resources include resources for feedback information associated with the second downlink transmission or an indication that the feedback information associated with the second downlink transmission may be to be rate-matched with other data of the uplink transmission.

In some examples of the method, apparatus, and non-transitory computer-readable medium described above, the determining comprises determining a time difference between receiving the uplink grant and receiving the second downlink transmission exceeds a threshold value, and identifying an indication in a downlink grant associated with the second downlink transmission that indicates whether the uplink feedback resources include resources for feedback information associated with the second downlink transmission.

In some examples of the method, apparatus, and non-transitory computer-readable medium described above, the uplink grant comprises an indication of a number of the plurality of downlink transmissions for which the UE may be to transmit feedback information during the uplink transmission.

Some examples of the method, apparatus, and non-transitory computer-readable medium described above may further include processes, features, means, or instructions for receiving, at the UE prior to receiving the first downlink transmission, a downlink grant associated with at least the first downlink transmission, the downlink grant comprising an indication of shared channel uplink resources for transmission of first feedback information associated with the first downlink transmission, and wherein the transmitting the uplink transmission comprises transmitting the first feedback information using the shared channel uplink resources based at least in part on the indication in the downlink grant.

Some examples of the method, apparatus, and non-transitory computer-readable medium described above may further include processes, features, means, or instructions for identifying, at the UE, first UCI associated with a first wireless service and second UCI associated with a second wireless service, wherein the first UCI and the second UCI to be transmitted to the base station in the uplink transmission, and wherein the first UCI may have a first performance reliability parameter and the second UCI may have a second performance reliability parameter that may be different than the first performance reliability parameter. Some examples of the method, apparatus, and non-transitory computer-readable medium described above may further include processes, features, means, or instructions for formatting the first UCI in accordance with the first performance reliability parameter and the second UCI in accordance with the second performance reliability parameter. Some examples of the method, apparatus, and non-transitory computer-readable medium described above may further include processes, features, means, or instructions for multiplexing the formatted first UCI and the formatted second UCI into the uplink transmission.

A method of wireless communication is described. The method may include receiving, at a UE, a downlink grant associated with at least a first downlink transmission from a base station, the downlink grant comprising an indication of shared channel uplink resources for transmission of feedback information associated with the first downlink transmission, generating the feedback information for the first downlink transmission, and transmitting the feedback information in an uplink transmission using the shared channel uplink resources based at least in part on the indication in the downlink grant.

An apparatus for wireless communication is described. The apparatus may include means for receiving, at a UE, a downlink grant associated with at least a first downlink transmission from a base station, the downlink grant comprising an indication of shared channel uplink resources for transmission of feedback information associated with the first downlink transmission, means for generating the feedback information for the first downlink transmission, and means for transmitting the feedback information in an uplink transmission using the shared channel uplink resources based at least in part on the indication in the downlink grant.

Another apparatus for wireless communication is described. The apparatus may include a processor, memory in electronic communication with the processor, and instructions stored in the memory. The instructions may be operable to cause the processor to receive, at a UE, a downlink grant associated with at least a first downlink transmission from a base station, the downlink grant comprising an indication of shared channel uplink resources for transmission of feedback information associated with the first downlink transmission, generate the feedback information for the first downlink transmission, and transmit the feedback information in an uplink transmission using the shared channel uplink resources based at least in part on the indication in the downlink grant.

A non-transitory computer readable medium for wireless communication is described. The non-transitory computer-readable medium may include instructions operable to cause a processor to receive, at a UE, a downlink grant associated with at least a first downlink transmission from a base station, the downlink grant comprising an indication of shared channel uplink resources for transmission of feedback information associated with the first downlink transmission, generate the feedback information for the first downlink transmission, and transmit the feedback information in an uplink transmission using the shared channel uplink resources based at least in part on the indication in the downlink grant.

In some examples of the method, apparatus, and non-transitory computer-readable medium described above, the feedback information may be transmitted using the shared channel uplink resources irrespective of whether an uplink grant may be received for the uplink transmission.

In some examples of the method, apparatus, and non-transitory computer-readable medium described above, the indication of shared channel uplink resources comprises at least a number of resource blocks (RBs) of the uplink transmission allocated for transmission of the feedback information.

Some examples of the method, apparatus, and non-transitory computer-readable medium described above may further include processes, features, means, or instructions for receiving an uplink grant that indicates resources and one or more parameters for the uplink transmission, and wherein the uplink transmission may be based at least in part on the uplink grant. In some examples of the method, apparatus, and non-transitory computer-readable medium described above, the uplink grant comprises an indication of a number of the plurality of downlink transmissions for which the UE may be to transmit feedback information during the uplink transmission.

In some examples of the method, apparatus, and non-transitory computer-readable medium described above, the uplink grant further comprises a grant of uplink feedback resources for transmission of feedback information associated with at least the first downlink transmission, and wherein the method further comprises determining whether the uplink feedback resources include resources for each of a plurality of downlink transmissions, and puncturing a portion of the uplink transmission that may be outside of the uplink feedback resources with feedback information from at least a second downlink transmission of the plurality of downlink transmissions based at least in part on determining that the uplink feedback resources do not include resources for the second downlink transmission.

Some examples of the method, apparatus, and non-transitory computer-readable medium described above may further include processes, features, means, or instructions for identifying, at the UE, first UCI associated with a first wireless service and second UCI associated with a second wireless service, wherein the first UCI and the second UCI to be transmitted to the base station in the uplink transmission, and wherein the first UCI may have a first performance reliability parameter and the second UCI may have a second performance reliability parameter that may be different than the first performance reliability parameter. Some examples of the method, apparatus, and non-transitory computer-readable medium described above may further include processes, features, means, or instructions for formatting the first UCI in accordance with the first performance reliability parameter and the second UCI in accordance with the second performance reliability parameter. Some examples of the method, apparatus, and non-transitory computer-readable medium described above may further include processes, features, means, or instructions for multiplexing the formatted first UCI and the formatted second UCI into the uplink transmission.

A method of wireless communication is described. The method may include identifying, at a UE, first UCI associated with a first wireless service and second UCI associated with a second wireless service, wherein the first UCI and the second UCI are to be transmitted to a base station in a first uplink transmission, and wherein the first UCI has a first performance reliability parameter and the second UCI has a second performance reliability parameter that is different than the first performance reliability parameter, formatting the first UCI in accordance with the first performance reliability parameter and the second UCI in accordance with the second performance reliability parameter, multiplexing the formatted first UCI and the formatted second UCI into the first uplink transmission, and transmitting the first uplink transmission to the base station.

An apparatus for wireless communication is described. The apparatus may include means for identifying, at a UE, first UCI associated with a first wireless service and second UCI associated with a second wireless service, wherein the first UCI and the second UCI are to be transmitted to a base station in a first uplink transmission, and wherein the first UCI has a first performance reliability parameter and the second UCI has a second performance reliability parameter that is different than the first performance reliability parameter, means for formatting the first UCI in accordance with the first performance reliability parameter and the second UCI in accordance with the second performance reliability parameter, means for multiplexing the formatted first UCI and the formatted second UCI into the first uplink transmission, and means for transmitting the first uplink transmission to the base station.

Another apparatus for wireless communication is described. The apparatus may include a processor, memory in electronic communication with the processor, and instructions stored in the memory. The instructions may be operable to cause the processor to identify, at a UE, first UCI associated with a first wireless service and second UCI associated with a second wireless service, wherein the first UCI and the second UCI are to be transmitted to a base station in a first uplink transmission, and wherein the first UCI has a first performance reliability parameter and the second UCI has a second performance reliability parameter that is different than the first performance reliability parameter, format the first UCI in accordance with the first performance reliability parameter and the second UCI in accordance with the second performance reliability parameter, multiplex the formatted first UCI and the formatted second UCI into the first uplink transmission, and transmit the first uplink transmission to the base station.

A non-transitory computer readable medium for wireless communication is described. The non-transitory computer-readable medium may include instructions operable to cause a processor to identify, at a UE, first UCI associated with a first wireless service and second UCI associated with a second wireless service, wherein the first UCI and the second UCI are to be transmitted to a base station in a first uplink transmission, and wherein the first UCI has a first performance reliability parameter and the second UCI has a second performance reliability parameter that is different than the first performance reliability parameter, format the first UCI in accordance with the first performance reliability parameter and the second UCI in accordance with the second performance reliability parameter, multiplex the formatted first UCI and the formatted second UCI into the first uplink transmission, and transmit the first uplink transmission to the base station.

In some examples of the method, apparatus, and non-transitory computer-readable medium described above, the multiplexing comprises frequency division multiplexing the formatted first UCI and the formatted second UCI into a PUSCH and a physical uplink control channel (PUCCH). In some examples of the method, apparatus, and non-transitory computer-readable medium described above, the multiplexing comprises time division multiplexing the formatted first UCI and the formatted second UCI into a PUCCH. In some examples of the method, apparatus, and non-transitory computer-readable medium described above, the formatting comprises independently encoding the formatted first UCI and the formatted second UCI. In some examples of the method, apparatus, and non-transitory computer-readable medium described above, the formatted first UCI may be encoded using a first number of modulation symbols and the formatted second UCI may be encoded using a second number of modulation symbols that may be different than the first number of modulation symbols. In some examples of the method, apparatus, and non-transitory computer-readable medium described above, the first UCI and the second UCI include feedback information indicating successful or unsuccessful reception of one or more downlink transmissions of each wireless service. In some examples of the method, apparatus, and non-transitory computer-readable medium described above, the first UCI and the second UCI include channel quality information (CQI) associated with each wireless service.

In some examples of the method, apparatus, and non-transitory computer-readable medium described above, an uplink grant comprises an indication of a number of a plurality of downlink transmissions for which the UE may be to transmit feedback information during the first uplink transmission.

Some examples of the method, apparatus, and non-transitory computer-readable medium described above may further include processes, features, means, or instructions for receiving an uplink grant including uplink feedback resources for transmission of feedback information associated with at least a first downlink transmission. Some examples of the method, apparatus, and non-transitory computer-readable medium described above may further include processes, features, means, or instructions for determining whether the uplink feedback resources include resources for each of a plurality of downlink transmissions. Some examples of the method, apparatus, and non-transitory computer-readable medium described above may further include processes, features, means, or instructions for puncturing a portion of the first uplink transmission that may be outside of the uplink feedback resources with feedback information from at least a second downlink transmission of the plurality of downlink transmissions based at least in part on determining that the uplink feedback resources do not include resources for the second downlink transmission.

Some examples of the method, apparatus, and non-transitory computer-readable medium described above may further include processes, features, means, or instructions for receiving, at the UE prior to receiving a first downlink transmission, a downlink grant associated with at least the first downlink transmission, the downlink grant comprising an indication of shared channel uplink resources for transmission of first feedback information associated with the first downlink transmission, and wherein the transmitting the first uplink transmission comprises transmitting the first feedback information using the shared channel uplink resources based at least in part on the indication in the downlink grant.

A method of wireless communication is described. The method may include transmitting, from a base station, a plurality of downlink transmissions to a UE, transmitting, to the UE, an uplink grant for an uplink transmission from the UE to the base station, the uplink grant comprising an indication of a number of the plurality of downlink transmissions for which the UE is to transmit feedback information during the uplink transmission, the feedback information indicating successful or unsuccessful receipt of each downlink transmission, and receiving the uplink transmission from the UE.

An apparatus for wireless communication is described. The apparatus may include means for transmitting, from a base station, a plurality of downlink transmissions to a UE, means for transmitting, to the UE, an uplink grant for an uplink transmission from the UE to the base station, the uplink grant comprising an indication of a number of the plurality of downlink transmissions for which the UE is to transmit feedback information during the uplink transmission, the feedback information indicating successful or unsuccessful receipt of each downlink transmission, and means for receiving the uplink transmission from the UE.

Another apparatus for wireless communication is described. The apparatus may include a processor, memory in electronic communication with the processor, and instructions stored in the memory. The instructions may be operable to cause the processor to transmit, from a base station, a plurality of downlink transmissions to a UE, transmit, to the UE, an uplink grant for an uplink transmission from the UE to the base station, the uplink grant comprising an indication of a number of the plurality of downlink transmissions for which the UE is to transmit feedback information during the uplink transmission, the feedback information indicating successful or unsuccessful receipt of each downlink transmission, and receive the uplink transmission from the UE.

A non-transitory computer readable medium for wireless communication is described. The non-transitory computer-readable medium may include instructions operable to cause a processor to transmit, from a base station, a plurality of downlink transmissions to a UE, transmit, to the UE, an uplink grant for an uplink transmission from the UE to the base station, the uplink grant comprising an indication of a number of the plurality of downlink transmissions for which the UE is to transmit feedback information during the uplink transmission, the feedback information indicating successful or unsuccessful receipt of each downlink transmission, and receive the uplink transmission from the UE.

In some examples of the method, apparatus, and non-transitory computer-readable medium described above, the indication of the number of the plurality of downlink transmissions may be indicated in a DAI transmitted in the uplink grant. In some examples of the method, apparatus, and non-transitory computer-readable medium described above, the feedback information is transmitted in a PUSCH transmission with uplink data from the UE, wherein the uplink data may be rate-matched around the feedback information.

A method of wireless communication is described. The method may include transmitting, from a base station, at least a first downlink transmission to a UE, transmitting, to the UE, an uplink grant for an uplink transmission from the UE to the base station, the uplink grant comprising an indication of uplink feedback resources for transmission of feedback information associated with at least the first downlink transmission, the feedback information indicating successful or unsuccessful receipt of at least the first downlink transmission, transmitting, to the UE, at least a second downlink transmission, determining whether the uplink feedback resources include resources for the second downlink transmission, receiving the uplink transmission from the UE, and identifying the feedback information for the first downlink transmission and the second downlink transmission based at least in part on the determining.

An apparatus for wireless communication is described. The apparatus may include means for transmitting, from a base station, at least a first downlink transmission to a UE, means for transmitting, to the UE, an uplink grant for an uplink transmission from the UE to the base station, the uplink grant comprising an indication of uplink feedback resources for transmission of feedback information associated with at least the first downlink transmission, the feedback information indicating successful or unsuccessful receipt of at least the first downlink transmission, means for transmitting, to the UE, at least a second downlink transmission, means for determining whether the uplink feedback resources include resources for the second downlink transmission, means for receiving the uplink transmission from the UE, and means for identifying the feedback information for the first downlink transmission and the second downlink transmission based at least in part on the determining.

Another apparatus for wireless communication is described. The apparatus may include a processor, memory in electronic communication with the processor, and instructions stored in the memory. The instructions may be operable to cause the processor to transmit, from a base station, at least a first downlink transmission to a UE, transmit, to the UE, an uplink grant for an uplink transmission from the UE to the base station, the uplink grant comprising an indication of uplink feedback resources for transmission of feedback information associated with at least the first downlink transmission, the feedback information indicating successful or unsuccessful receipt of at least the first downlink transmission, transmit, to the UE, at least a second downlink transmission, determine whether the uplink feedback resources include resources for the second downlink transmission, receive the uplink transmission from the UE, and identify the feedback information for the first downlink transmission and the second downlink transmission based at least in part on the determining.

A non-transitory computer readable medium for wireless communication is described. The non-transitory computer-readable medium may include instructions operable to cause a processor to transmit, from a base station, at least a first downlink transmission to a UE, transmit, to the UE, an uplink grant for an uplink transmission from the UE to the base station, the uplink grant comprising an indication of uplink feedback resources for transmission of feedback information associated with at least the first downlink transmission, the feedback information indicating successful or unsuccessful receipt of at least the first downlink transmission, transmit, to the UE, at least a second downlink transmission, determine whether the uplink feedback resources include resources for the second downlink transmission, receive the uplink transmission from the UE, and identify the feedback information for the first downlink transmission and the second downlink transmission based at least in part on the determining.

In some examples of the method, apparatus, and non-transitory computer-readable medium described above, the determining comprises determining a time difference between receiving the uplink grant and receiving the second downlink transmission, and determining whether the uplink feedback resources include resources for feedback information associated with the second downlink transmission based at least in part on the time difference.

In some examples of the method, apparatus, and non-transitory computer-readable medium described above, the uplink feedback resources may be determined to include resources for feedback information associated with the second downlink transmission when the time difference may be below a threshold value and the uplink feedback resources may be determined not to include resources for feedback information associated with the second downlink transmission when the time difference may be at or above the threshold value.

In some examples of the method, apparatus, and non-transitory computer-readable medium described above, the time difference corresponds to a difference in one or more of a number of subframes, a number of slots, a number of symbols, a number of mini-slots, or an absolute time between receiving the uplink grant and receiving the second downlink transmission.

In some examples of the method, apparatus, and non-transitory computer-readable medium described above, a downlink grant for the second downlink transmission includes an indication of whether the uplink feedback resources include resources for feedback information associated with the second downlink transmission.

A method of wireless communication is described. The method may include transmitting, from a base station to a UE, a downlink grant associated with at least a first downlink transmission from the base station, the downlink grant comprising an indication of shared channel uplink resources for use in transmission of feedback information associated with the first downlink transmission irrespective of whether the UE receives an uplink grant for an uplink transmission, transmitting the uplink grant to the UE, the uplink grant comprising one or more parameters for the shared channel uplink resources for an uplink transmission containing the feedback information, and receiving the feedback information from the UE in the uplink transmission.

An apparatus for wireless communication is described. The apparatus may include means for transmitting, from a base station to a UE, a downlink grant associated with at least a first downlink transmission from the base station, the downlink grant comprising an indication of shared channel uplink resources for use in transmission of feedback information associated with the first downlink transmission irrespective of whether the UE receives an uplink grant for an uplink transmission, means for transmitting the uplink grant to the UE, the uplink grant comprising one or more parameters for the shared channel uplink resources for an uplink transmission containing the feedback information, and means for receiving the feedback information from the UE in the uplink transmission.

Another apparatus for wireless communication is described. The apparatus may include a processor, memory in electronic communication with the processor, and instructions stored in the memory. The instructions may be operable to cause the processor to transmit, from a base station to a UE, a downlink grant associated with at least a first downlink transmission from the base station, the downlink grant comprising an indication of shared channel uplink resources for use in transmission of feedback information associated with the first downlink transmission irrespective of whether the UE receives an uplink grant for an uplink transmission, transmit the uplink grant to the UE, the uplink grant comprising one or more parameters for the shared channel uplink resources for an uplink transmission containing the feedback information, and receive the feedback information from the UE in the uplink transmission.

A non-transitory computer readable medium for wireless communication is described. The non-transitory computer-readable medium may include instructions operable to cause a processor to transmit, from a base station to a UE, a downlink grant associated with at least a first downlink transmission from the base station, the downlink grant comprising an indication of shared channel uplink resources for use in transmission of feedback information associated with the first downlink transmission irrespective of whether the UE receives an uplink grant for an uplink transmission, transmit the uplink grant to the UE, the uplink grant comprising one or more parameters for the shared channel uplink resources for an uplink transmission containing the feedback information, and receive the feedback information from the UE in the uplink transmission.

In some examples of the method, apparatus, and non-transitory computer-readable medium described above, the feedback information may be transmitted using the shared channel uplink resources irrespective of whether an uplink grant may be received for the uplink transmission. Some examples of the method, apparatus, and non-transitory computer-readable medium described above may further include processes, features, means, or instructions for transmitting an uplink grant that indicates resources and one or more parameters for the uplink transmission, and wherein the uplink transmission may be based at least in part on the uplink grant.

In some examples of the method, apparatus, and non-transitory computer-readable medium described above, the indication of shared channel uplink resources comprises at least a number of RBs of the uplink transmission allocated for transmission of the feedback information.

A method of wireless communication is described. The method may include configuring a UE with a first wireless service for communications between the UE and a base station and a second wireless service for communications between the UE and the base station, wherein the first wireless service has a first performance reliability parameter and the second wireless service has a second performance reliability parameter that is different than the first performance reliability parameter, receiving, in a first uplink transmission from the UE, first UCI associated with the first wireless service established, and second UCI associated with the second wireless service, wherein the first UCI is formatted in accordance with the first performance reliability parameter and the second UCI is formatted in accordance with the second performance reliability parameter, and wherein the first UCI is multiplexed with the second UCI in the first uplink transmission, and decoding the first UCI and the second UCI based at least in part on the first reliability parameter and the second reliability parameter.

An apparatus for wireless communication is described. The apparatus may include means for configuring a UE with a first wireless service for communications between the UE and a base station and a second wireless service for communications between the UE and the base station, wherein the first wireless service has a first performance reliability parameter and the second wireless service has a second performance reliability parameter that is different than the first performance reliability parameter, means for receiving, in a first uplink transmission from the UE, first UCI associated with the first wireless service established, and second UCI associated with the second wireless service, wherein the first UCI is formatted in accordance with the first performance reliability parameter and the second UCI is formatted in accordance with the second performance reliability parameter, and wherein the first UCI is multiplexed with the second UCI in the first uplink transmission, and means for decoding the first UCI and the second UCI based at least in part on the first reliability parameter and the second reliability parameter.

Another apparatus for wireless communication is described. The apparatus may include a processor, memory in electronic communication with the processor, and instructions stored in the memory. The instructions may be operable to cause the processor to configure a UE with a first wireless service for communications between the UE and a base station and a second wireless service for communications between the UE and the base station, wherein the first wireless service has a first performance reliability parameter and the second wireless service has a second performance reliability parameter that is different than the first performance reliability parameter, receive, in a first uplink transmission from the UE, first UCI associated with the first wireless service established, and second UCI associated with the second wireless service, wherein the first UCI is formatted in accordance with the first performance reliability parameter and the second UCI is formatted in accordance with the second performance reliability parameter, and wherein the first UCI is multiplexed with the second UCI in the first uplink transmission, and decode the first UCI and the second UCI based at least in part on the first reliability parameter and the second reliability parameter.

A non-transitory computer readable medium for wireless communication is described. The non-transitory computer-readable medium may include instructions operable to cause a processor to configure a UE with a first wireless service for communications between the UE and a base station and a second wireless service for communications between the UE and the base station, wherein the first wireless service has a first performance reliability parameter and the second wireless service has a second performance reliability parameter that is different than the first performance reliability parameter, receive, in a first uplink transmission from the UE, first UCI associated with the first wireless service established, and second UCI associated with the second wireless service, wherein the first UCI is formatted in accordance with the first performance reliability parameter and the second UCI is formatted in accordance with the second performance reliability parameter, and wherein the first UCI is multiplexed with the second UCI in the first uplink transmission, and decode the first UCI and the second UCI based at least in part on the first reliability parameter and the second reliability parameter.

In some examples of the method, apparatus, and non-transitory computer-readable medium described above, the formatted first UCI and the formatted second UCI may be multiplexed according to frequency division multiplexing into a PUSCH and a PUCCH. In some examples of the method, apparatus, and non-transitory computer-readable medium described above, the formatted first UCI and the formatted second UCI may be multiplexed according to time division multiplexing into a PUCCH.

In some examples of the method, apparatus, and non-transitory computer-readable medium described above, the formatting comprises independently encoding the formatted first UCI and the formatted second UCI. In some examples of the method, apparatus, and non-transitory computer-readable medium described above, the formatted first UCI and the formatted second UCI may be independently encoded. In some examples of the method, apparatus, and non-transitory computer-readable medium described above, the first UCI and the second UCI include feedback information indicating successful or unsuccessful reception of one or more downlink transmissions of each wireless service. In some examples of the method, apparatus, and non-transitory computer-readable medium described above, the first UCI and the second UCI include CQI associated with each wireless service.

DETAILED DESCRIPTION

Figure 1:
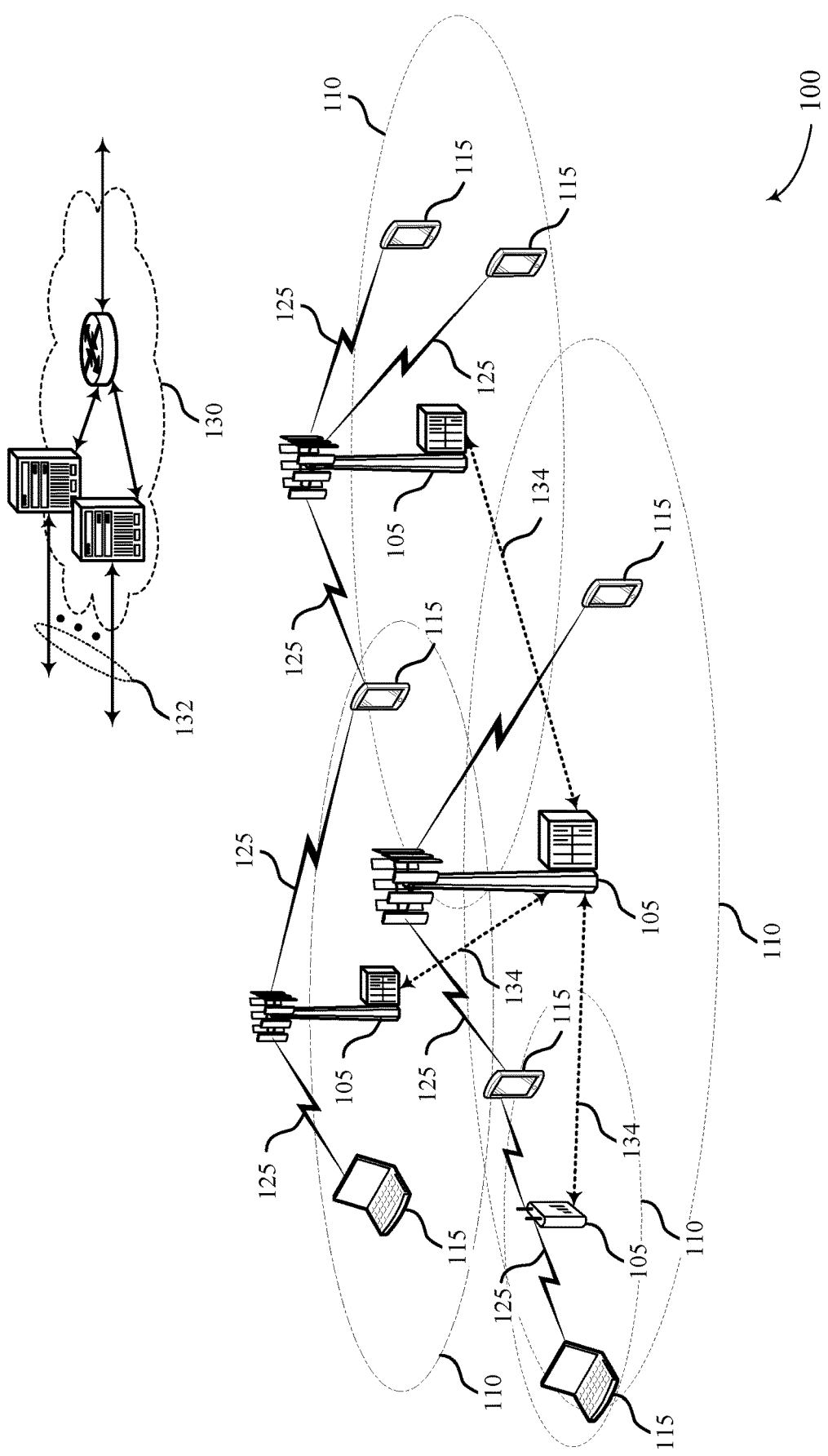
FIGS. 1 through 2 illustrate examples of wireless communications systems that supports control and data multiplexing in uplink wireless transmissions in accordance with aspects of the present disclosure.

In some wireless communications networks, a base station may provide scheduling information to user equipments (UEs), which may include one or more downlink grants that indicate allocated downlink resources for downlink transmissions to a UE, and one or more uplink grants that indicate allocated uplink resources for uplink transmissions from the UE to a base station. Uplink resources may include physical uplink control channel (PUCCH) resources, which may be used to transmit certain control information from a UE to a base station, and physical uplink shared channel (PUSCH) resources, which may be used to transmit data and/or control information from the UE to the base station. In some systems, uplink control information (UCI), such as hybrid automatic repeat request acknowledge-negative acknowledge (HARQ ACK/NACK) feedback information, may be transmitted by a UE to a base station using PUSCH resources. When using such PUSCH resources for UCI transmissions, a UE may puncture the PUSCH data with the UCI, in some systems (e.g., Long Term Evolution (LTE) and LTE-Advanced (LTE-A)). Such puncturing causes some loss relative to a scheme where data rate-matches around UCI, as certain data will not be transmitted in favor of transmitting the UCI. However, if a UE did not successfully receive a downlink assignment (e.g., if the UE misses a downlink grant transmission), the UE will not attempt to receive the associated downlink data transmission and thus would not transmit the UCI but rather transmit the regularly scheduled uplink data. Thus, if such a technique were to be used, the base station would have to attempt to decode both hypotheses in order to properly receive and decode the uplink transmission.

Further, in some systems, such as fifth generation (5G) or New Radio (NR) systems, a UE and base station may concurrently support multiple different services, which may each have different quality of service (QoS) requirements. For example, a first service may be a service for low latency communications, such as ultra-reliable low latency communications (URLLC), in which uplink and downlink communication may use shortened transmission time intervals (TTIs) that have a reduced length relative to TTIs of other services that may be relatively latency insensitive, such as mobile broadband (MBB) transmissions that may use a 1 ms TTI duration. In such systems, multiple different services for data communications may be selected depending upon the nature of the communications. For example, communications that require low latency and high reliability, sometimes referred to as mission critical (MiCr) communications, may be served through a lower-latency service (e.g., a URLLC service) that uses shortened TTIs. Correspondingly, communications that are more delay-tolerant may be served through a service that provides relatively higher throughput with somewhat higher latency, such as a mobile broadband service (e.g., an enhanced mobile broadband (eMBB) service) that uses 1 ms TTIs. In other examples, communications may be with UEs that are incorporated into other devices (e.g., meters, vehicles, appliances, and machinery), and a machine-type communication (MTC) service (e.g., massive MTC (mMTC)) may be used for such communications. In some cases, different services (e.g., enhanced MBB (eMBB), URLLC, mMTC) may have different TTIs, different sub-carrier (or tone) spacing and different cyclic prefixes.

Various techniques discussed herein provide for transmission UCI from a UE to a base station in an efficient manner and that meets quality of service parameters of different services that may concurrently have UCI transmitted from the UE. In some cases, a UE may transmit UCI using PUSCH resources, and PUSCH data may be rate-matched around the UCI to provide efficient transmission of both the PUSCH data and the UCI. In some cases, a base station may provide an indication to the UE in an uplink grant of a number of downlink transmissions for which the UE is to provide feedback information (e.g., HARQ ACK/NACK feedback information). Such an indication may be, for example, an downlink assignment index (DAI) provided in an uplink grant that may indicate to the UE a number of downlink transmission that are to have ACK/NACK data transmitted by the UE in UCI. In such a manner, the UE may transmit UCI having an established size, and the base station may receive the PUSCH and UCI data using a single decoding hypothesis.

In some cases, one or more downlink grants may be provided near or after the transmission of an uplink grant which were not anticipated when the base station provided uplink resources in an uplink grant. For example, a URLLC transmission having a high priority may be transmitted after a base station provides an uplink grant, and UCI (e.g., ACK/NACK information) for the late-arriving downlink transmission may not have been anticipated when the base station provided the uplink grant. In such cases, the UE may still transmit the ACK/NACK associated with the late-arriving downlink transmission by puncturing PUSCH data transmission with the UCI. In some cases, the UE may only puncture portions of the PUSCH transmission that do not contain other UCI. In some cases, the downlink grant for the late-arriving downlink transmission may include an explicit indication (e.g., a flag or bit set to provide an indication) of whether or not previously allocated uplink resources include resources for providing feedback information (e.g., HARQ ACKNACK information) for that particular downlink transmission. In other cases, a time difference between the downlink grant and the uplink grant that indicates allocated uplink resources may be used to determine whether the uplink resources include resources for providing feedback information for a particular downlink transmission. For example, if a time difference between the downlink grant and the uplink grant (either before or after the time of the uplink grant) is less than a threshold, the UE may assume that the allocated uplink resources include resources for providing feedback information, and may otherwise assume that no resources have been allocated for that particular downlink transmission (in which case the UE may puncture a PUSCH transmission, in some examples).

In some cases, in order to provide that a UE may still provide feedback information for one or more downlink transmissions even if the UE misses an uplink grant from a base station, one or more of the downlink transmissions may include (e.g., one or more downlink grant transmissions) may directly indicate that corresponding feedback information is to be transmitted using PUSCH resources. In some examples, such an indication may include enough information about the PUSCH grant (e.g., a number of resource blocks (RBs)) to allow the UE to be able to transmit the feedback even if the PUSCH grant is missed.

In further cases, UCI for multiple different wireless services may be multiplexed in an uplink transmission to provide UCI associated with each wireless service. In some cases, a first wireless service (e.g., a URLLC service) UCI may be transmitted on a different PUCCH/PUSCH transmission than a second wireless service (e.g., an eMBB service) UCI transmission. For example, a UE may frequency division multiplex (FDM) PUSCH and PUCCH, with UCI for the first wireless service transmitted using PUCCH resources and UCI for the second wireless service transmitted using PUSCH resources. In other examples, a UE may time division multiplex (TDM) PUCCH transmissions with UCI for the first wireless service with other PUCCH transmissions with UCI for the second wireless service. In some cases, the PUCCH durations and/or RB allocations may be different, to meet the different performance requirements the different wireless services. In other cases, a UE may transmit UCI for both wireless services in a same transmissions, but independently encode each UCI, and possibly with different beta factors, which may provide different numbers of modulation symbols to achieve different reliability for each wireless service. In some cases, a downlink grant of a wireless service may indicate PUCCH resources for corresponding UCI (e.g., ACK/NACK) transmission.

Aspects of the disclosure are initially described in the context of a wireless communications system. Aspects of the disclosure are further illustrated by and described with reference to apparatus diagrams, system diagrams, and flowcharts that relate to control and data multiplexing in uplink wireless transmissions.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be an LTE network, an LTE-A network, or an NR network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., MTC, narrowband Internet-of-Things (NB-IoT), eMBB, or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a TTI. In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling.

A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform-spread-OFDM (DFT-s-OFDM)).

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using TDM techniques, FDM techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

As indicated above, the wireless communications system 100 of FIG. 1 may employ various techniques that provide for efficient communication of UCI from a UE 115 to a base station 105. UCI may be transmitted in uplink transmissions in which PUSCH data may be rate-matched around the UCI in uplink transmissions. In some cases, an uplink grant to a UE 115 may include information on amounts or types of UCI to be transmitted by a UE. In some cases, downlink grant transmissions may include an indication of allocated UCI resources, whether associated UCI is to be included in allocated UCI resources, parameters for formatting and multiplexing of multiple wireless services at the UE, or any combination thereof.

Figure 2:
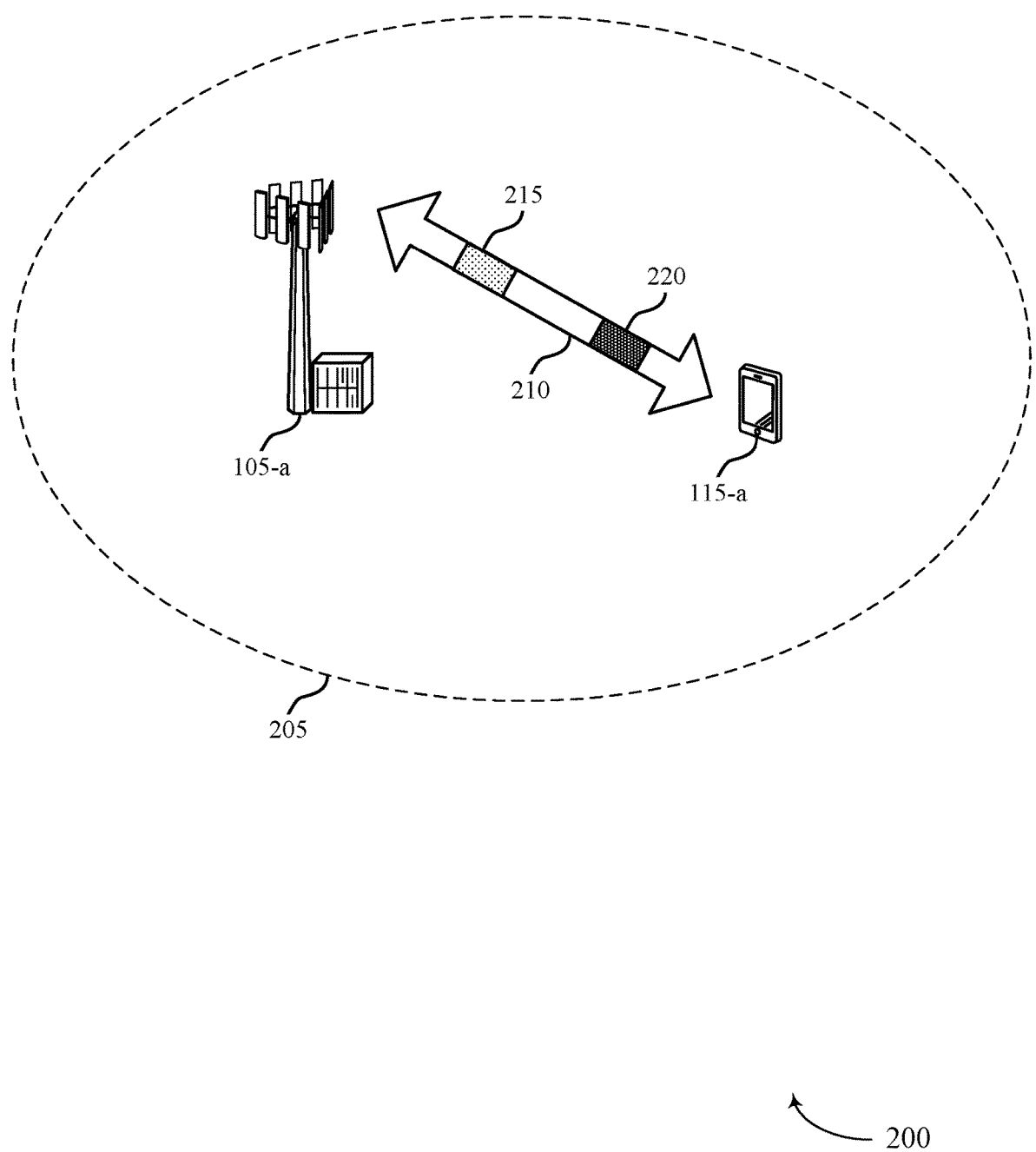

FIG. 2 illustrates an example of a wireless communication system 200 that supports control and data multiplexing in uplink wireless transmissions in accordance with various aspects of the present disclosure. In some examples, wireless communication system 200 may implement aspects of wireless communication system 100. Wireless communication system 200 may include a base station 105-a and a UE 115-a, which may be examples of the corresponding devices described with reference to FIG. 1.

In some examples, base station 105-a may be in communication with one or more UEs 115 within geographic coverage area 205. For example, base station 105-a may be in communication with UE 115-a via bidirectional communication link 210. Base station 105-a may transmit one or more downlink transmissions 215, which may include downlink grant transmissions, downlink data transmissions, or any combination thereof. The UE 115-a may transmit uplink transmissions 220 to the base station 105-a, where uplink transmissions 220 may contain UCI such as AKC/NACK feedback information, channel quality information (CQI), other UCI, or any combination thereof.

As indicated above, in some cases, one or more downlink transmissions 215 may include a downlink grant, which indicates downlink resources allocated for a downlink transmission from the base station 105-a to the UE 115-a. A downlink grant may also indicate, in some examples, uplink resources or enough information on uplink resources to allow the UE 115-a to transmit UCI for the associated downlink transmission 215 in an uplink transmission 220. In some cases, the UE 115-a may not successfully receive a downlink grant in a downlink transmission 215 (e.g., due to interference from another transmitter or poor coverage conditions). In such cases, the UE 115-a will not know to monitor for the corresponding downlink data, and may not know that the base station 105-a is expecting associated UCI in an uplink transmission. In some cases, the base station 105-a, in an uplink grant to the UE, may include DAI information which may be read by the UE 115-a to determine an amount of UCI (e.g., a number of ACK/NACK bits) that is to be transmitted. For example, the DAI inserted in the uplink grant may convey how many ACK/NACKs are to be multiplexed with the PUSCH it schedules. Thus, even if the UE 115-a missed the downlink physical downlink control channel (PDCCH) associated with the downlink grant that is to be acknowledged, the UE 115-a may fill in a "dummy" NACK for the associated physical downlink shared channel (PDSCH) in uplink transmission 220. Thus, the base station 105-a may be aware of how much feedback information the UE 115-a will send, and other uplink PUSCH data can be rate-matched around the UCI. In some cases, the UE 115-a may provide a tri-state ACK/NACK feedback that distinguishes between missed PDCCH and PDSCH decode failure, in which case the dummy NACK will then indicate a missed-PDCCH.

Additionally or alternatively, a UE 115-a may miss a PDCCH transmission in downlink transmissions 215 that includes an uplink grant for one or more of the downlink transmission 215. In such cases, the UE 115-a may not be able to transmit the uplink transmission 220 with the appropriate UCI. In some examples of the techniques provided herein, one or more of the downlink grants may directly indicate that a corresponding ACK/NACK transmission is to be transmitted using PUSCH resources of uplink transmission 220. In some cases, the downlink grants may include enough information (e.g., a number of RBs) about the PUSCH grant to allow the UE 115-a to be able to transmit the ACK/NACK feedback even if the PUSCH grant is missed. In some cases, base station 105-a may omit information specific to a PUSCH grant (e.g., MCS). Using such information, the UE 115-a may transmit feedback ACK/NACK information irrespective of whether the PUSCH grant is successfully or unsuccessfully received.

Also as indicated above, in some cases, the base station 105-a and the UE 115-a may communicate using two or more concurrent wireless services, such as eMBB and URLLC. In such cases, the UCI transmitted by the UE 115-a in uplink transmissions 220 may have different performance requirements. For example, an eMBB ACK/NACK transmission may have a performance requirement of 0.1% block error rate (BLER), while a URLLC ACK/NACK transmission may need 0.001% BLER. In some cases, UE 115-a may multiplex such different UCI for different wireless services on different PUCCH/PUSCH resources in uplink transmission 220. For example, UE 115-*a* may FDM PUSCH and PUCCH resources, with UCI for a first service transmitted on PUCCH resources and UCI for a second service transmitted on PUSCH resources. In other examples, the UE 115-*a* may TDM PUCCH resources for a first service with PUCCH resources for a second service. The PUCCH durations and/or RB allocations may be different, to meet the different performance requirements. In other examples, the UE 115-*a* may transmit UCI for each service on a same transmission, but independently encode (e.g., using different beta factors) the different UCI to provide a different number of modulation symbols to achieve different reliability as required by QoS parameters of each service. In some cases, a downlink grant may indicate a PUCCH resource for a corresponding ACK/NACK feedback transmission. While various of the examples herein discuss ACK/NACK feedback information as the UCI transmitted from the UE 115-*a*, techniques provided herein apply to other types of UCI as well. For example, UE 115-*a* may transmit CQIs for URLLC and eMBB separately, or UE 115-*a* may independently encode and multiplex CQIs for URLLC and eMBB together (e.g., using different beta factors).

Figure 3:
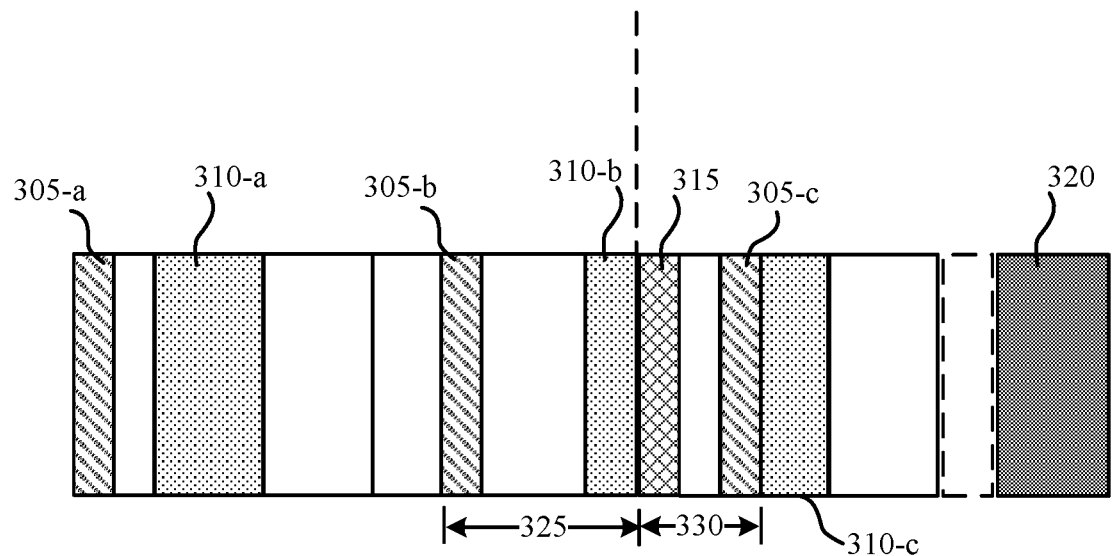
FIG. 3 illustrates an example of wireless resources that support control and data multiplexing in uplink wireless transmissions in accordance with aspects of the present disclosure.

FIG. 3 illustrates an example of wireless resources 300 that support control and data multiplexing in uplink wireless transmissions in accordance with various aspects of the present disclosure. In some examples, wireless resources 300 may implement aspects of wireless communication system 100. As indicated above, a base station (e.g., a base station 105 of FIG. 1 or 2) may transmit downlink grant transmissions 305, and downlink data transmissions 310 to a UE (e.g., a UE 115 of FIG. 1 or 2). In some cases, high priority downlink data (e.g. URLLC data) may arrive at a base station and be transmitted to the UE in a late-arriving downlink transmission 310-*c* for which uplink resources for an associated ACK/NACK feedback transmission have not been allocated in a related uplink grant. In some examples, the base station may budget for some extra later downlink grants when allocating uplink resources, and may optionally include such extra later downlink grants in the DAI issued together with the uplink grant. Such downlink grants may not be sent if not needed. However, such missing downlink grants may contribute to a UE's PDCCH BLER monitoring, as the UE may be unaware that the base station intentionally did now send the grant, in which case the base station may adjust the UE's BLER reports accordingly, or signal the UE to do so periodically.

In other cases, late-arriving or unanticipated downlink grants may have associated UCI that punctures the PUSCH data. In such a manner, extra downlink grants may not need to be budgeted for by a base station. Such UCI may be transmitted to puncture PUSCH data, rather than puncturing resources allocated for other UCI transmissions, since the resource locations for such UCI transmissions in the modulation-symbol mapping are known. In some cases, both the UE and the base station may determine which UCI transmissions are anticipated and have allocated uplink resources and which UCI transmissions are not anticipated. In some examples, such a determination may be made based on the timing of downlink grants 305 and an uplink grant 315. For example, UCI transmissions corresponding to a downlink grant 305-*b* received within a certain first time period 325 (e.g., a threshold number of time units) before the uplink grant 315, or within a certain second time period 330 after the uplink grant 315, may be assumed to be unanticipated. The time units may correspond to a slot, subframe, OFDM symbol, mini-slot, or absolute time (e.g., milliseconds), for example. Thus, in this example, UCI associated with downlink grants 305-*b* and 305-*c*, and associated downlink data transmissions 310-*b* and 310-*c* may be treated as unanticipated, and the UE may puncture PUSCH transmission with corresponding UCI data in uplink transmission 320, while UCI associated with downlink grant 305-*a* and associated downlink data transmission 310-*a* may be treated as anticipated and the UE may rate-match PUSCH data around the corresponding UCI.

In other examples, the downlink grants 305 may include an explicit indication (e.g., a bit or flag) about whether they are 'anticipated' (included in the DAI counter) or not, or alternatively whether they are to be rate-matched or not. In other cases, combinations of explicit indications and timing may be used to determine whether UCI is rate-matched around or punctures PUSCH data. For example, a base station may provide explicit indications only on downlink grants received within a time threshold of the uplink grant. In some cases, the base station may provide explicit indications also for UCI that is to be transmitted using PUCCH resources. For example, a UE may transmit an ACK/NACK feedback for an unanticipated downlink transmission (e.g., an urgent URLLC transmission) along with anticipated ACK/NACK feedback in PUCCH resources, in which cases a base station may perform multiple hypotheses decoding to determine if those downlink grants are received or not received. In some cases, the base station may enable or disable such explicit indications (e.g., using RRC signaling).

Figure 4:
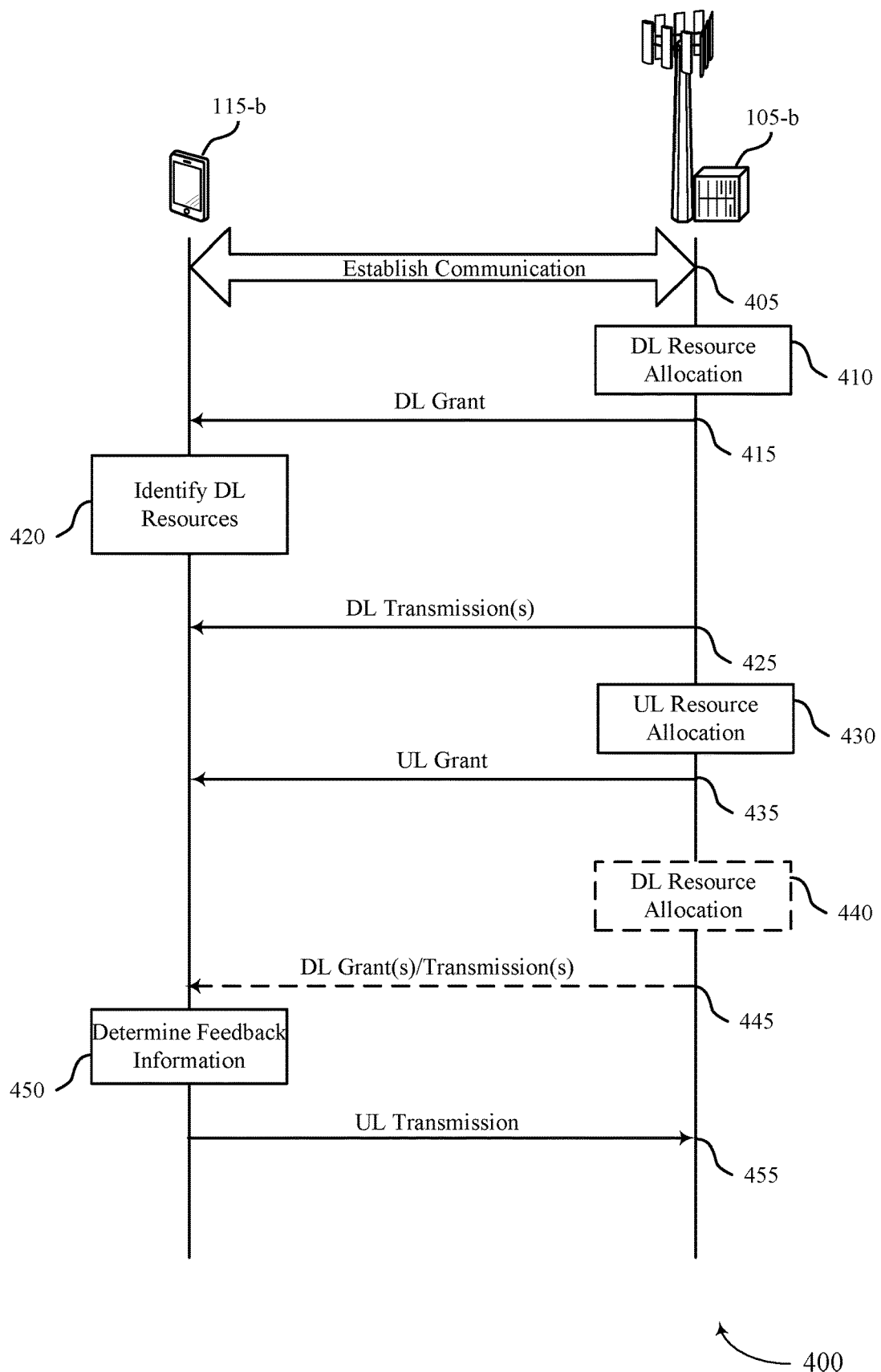
FIGS. 4 and 5 illustrate examples of process flows that support control and data multiplexing in uplink wireless transmissions in accordance with aspects of the present disclosure.

FIG. 4 illustrates an example of a process flow 400 that supports control and data multiplexing in uplink wireless transmissions in accordance with various aspects of the present disclosure. In some examples, process flow 400 may implement aspects of wireless communication system 100. Process flow 400 may include a base station 105-*b*, and a UE 115-*b*, which may be examples of the corresponding devices described with reference to FIG. 1-2. The base station 105-*b* and the UE 115-*b* may establish a connection 405 according to established connection establishment techniques for the wireless communications system.

At block 410, the base station 105-*b* may identify a downlink resource allocation for downlink transmissions to the UE 115-*b*. The downlink resource allocation may be determined based on, for example, an amount of downlink data to be transmitted to the UE 115-*b*, channel conditions at the UE 115-*b*, other traffic, other parameters for allocating downlink resources, or any combinations thereof. The base station 105-*b* may transmit the downlink allocations in one or more downlink grant 415 to the UE 115-*b*.

The UE 115-*b*, at block 420, may receive the downlink grant 415 and identify downlink resources to be monitored for downlink transmissions. The base station 105-*b* may transmit the downlink transmission(s) 425 to the UE 115-*b*. In some cases, as discussed above, the downlink grant 415 may include information for uplink transmissions of UCI (e.g., ACK/NACK feedback) such that the UE 115-*b* may transmit the UCI even in the absence of receiving an uplink grant 435.

At block 430, the base station 105-*b* may determine an uplink resource allocation for uplink transmissions from the UE 115-*b* to the base station 105-*a*. The uplink resource allocation may include PUCCH and PUSCH resources, and the base station 105-*a* may transmit an indication of the uplink resources in uplink grant 435. In some cases, the uplink grant 435 includes DAI, which can be used by the UE 115-*b* to determine an amount of UCI that is to be transmitted in the corresponding uplink transmission 455.

At optional block 440, the base station 105-b may determine one or more further downlink resource allocations for one or more further downlink transmissions 445. In some cases, the further downlink transmissions 445 may be high priority downlink transmissions received at the base station 105-b after uplink resources provided in the uplink grant 435 are generated.

At block 450, the UE 115-b may determine feedback information (or other UCI) associated with each of the downlink grants and transmissions. The UE 115-b may then transmit uplink transmission(s) 455.

Figure 5:
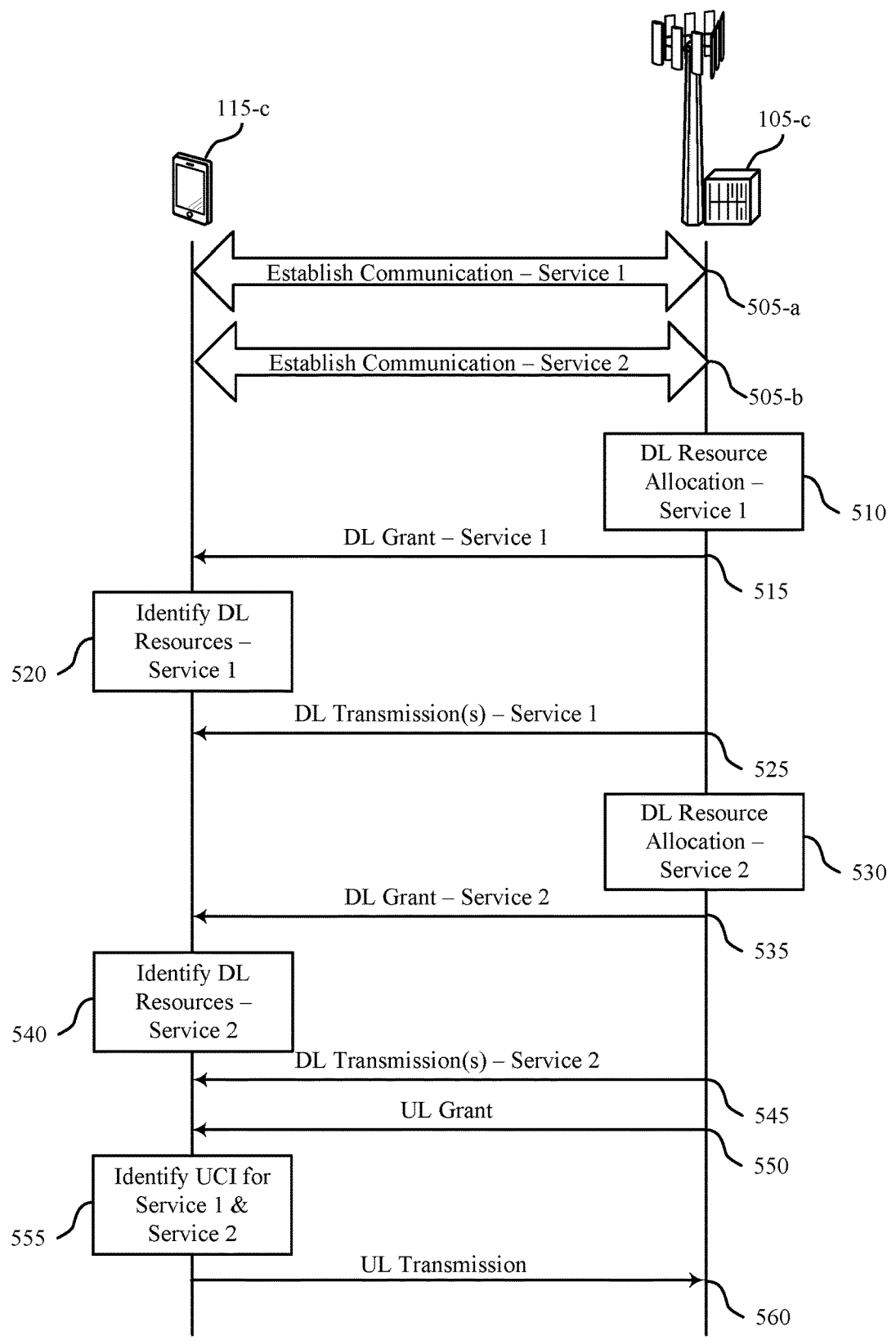

FIG. 5 illustrates an example of a process flow 500 that supports control and data multiplexing in uplink wireless transmissions in accordance with various aspects of the present disclosure. In some examples, process flow 500 may implement aspects of wireless communication system 100. Process flow 500 may include a base station 105-c, and a UE 115-c, which may be examples of the corresponding devices described with reference to FIGS. 1 and 2. The base station 105-c and the UE 115-c may establish a first connection 505-a for a first wireless service (e.g., a URLLC service) according to established connection establishment techniques for the wireless communications system. The base station 105-c and the UE 115-c may also establish a second connection 505-b for a second wireless service (e.g., an eMBB service) according to established connection establishment techniques for the wireless communications system.

At block 510, the base station 105-c may identify a downlink resource allocation for downlink transmissions of the first wireless service to the UE 115-c. The downlink resource allocation may be determined based on, for example, an amount of downlink data to be transmitted to the UE 115-c, channel conditions at the UE 115-c, other traffic, other parameters for allocating downlink resources, or any combinations thereof. The base station 105-c may transmit the downlink allocations for the first service in one or more downlink grants 515 to the UE 115-c.

The UE 115-c, at block 520, may receive the downlink grant 515 and identify downlink resources to be monitored for downlink transmissions of the first service. The base station 105-c may transmit the downlink transmission(s) 525 of the first service to the UE 115-c. In some cases, as discussed above, the downlink grant 515 may include information for uplink transmissions of UCI (e.g., ACK/NACK feedback) such that the UE 115-c may transmit the UCI even in the absence of receiving an uplink grant 550.

Similarly, at block 530, the base station 105-c may identify a downlink resource allocation for downlink transmissions of the second wireless service to the UE 115-c. The downlink resource allocation may be determined based on, for example, an amount of downlink data to be transmitted to the UE 115-c, channel conditions at the UE 115-c, other traffic, other parameters for allocating downlink resources, or any combinations thereof. The base station 105-c may transmit the downlink allocations for the second service in one or more downlink grants 535 to the UE 115-c.

The UE 115-c, at block 540, may receive the downlink grant 535 and identify downlink resources to be monitored for downlink transmissions of the second service. The base station 105-c may transmit the downlink transmission(s) 545 of the second service to the UE 115-c. In some cases, as discussed above, the downlink grant 545 may include information for uplink transmissions of UCI (e.g., ACK/NACK feedback) such that the UE 115-c may transmit the UCI even in the absence of receiving an uplink grant 550.

At block 555, the UE 115-c may determine UCI (e.g., feedback information and/or CQI) for each service associated with each of the downlink grants and transmissions. The UE 115-c may then format, multiplex, and transmit uplink transmission(s) 560 according to techniques such as discussed herein.

Figure 6:
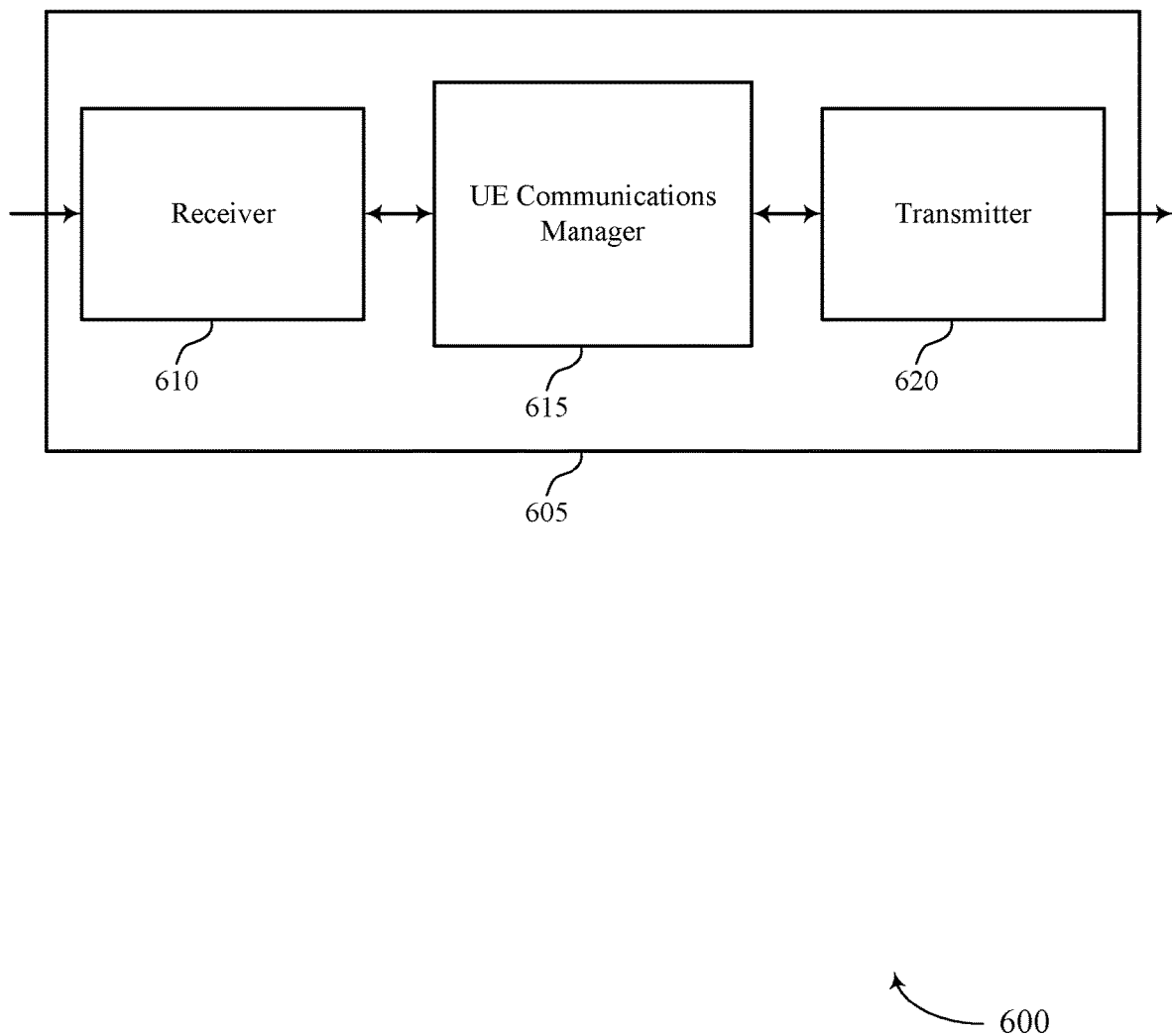
FIGS. 6 through 8 show block diagrams of a device that supports control and data multiplexing in uplink wireless transmissions in accordance with aspects of the present disclosure.

FIG. 6 shows a block diagram 600 of a wireless device 605 that supports control and data multiplexing in uplink wireless transmissions in accordance with aspects of the present disclosure. Wireless device 605 may be an example of aspects of a UE 115 as described herein. Wireless device 605 may include receiver 610, UE communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to control and data multiplexing in uplink wireless transmissions). Information may be passed on to other components of the device. The receiver 610 may be an example of aspects of the transceiver 935 described with reference to FIG. 9. The receiver 610 may utilize a single antenna or a set of antennas.

UE communications manager 615 may be an example of aspects of the UE communications manager 915 described with reference to FIG. 9.

UE communications manager 615 and/or at least some of its various sub-components may be implemented in hardware, software executed by a processor, firmware, or any combination thereof. If implemented in software executed by a processor, the functions of the UE communications manager 615 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The UE communications manager 615 and/or at least some of its various sub-components may be physically located at various positions, including being distributed such that portions of functions are implemented at different physical locations by one or more physical devices. In some examples, UE communications manager 615 and/or at least some of its various sub-components may be a separate and distinct component in accordance with various aspects of the present disclosure. In other examples, UE communications manager 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 615 may receive a set of downlink transmissions from a base station, receive an uplink grant associated with an uplink transmission from the UE to the base station, the uplink grant including an indication of a number of the set of downlink transmissions for which the UE is to transmit feedback information during the uplink transmission, the feedback information indicating successful or unsuccessful receipt of each downlink transmission, generate the feedback information for the set of downlink transmissions, and transmit the uplink transmission to the base station.

The UE communications manager 615 may also receive at least a first downlink transmission from a base station, receive an uplink grant associated with an uplink transmission from the UE to the base station, the uplink grant including an indication of uplink feedback resources for transmission of feedback information associated with at least the first downlink transmission, the feedback information indicating successful or unsuccessful receipt of at least the first downlink transmission. UE communications manager 615 may receive at least a second downlink transmission from the base station, determine whether the uplink feedback resources include resources for feedback information associated with the second downlink transmission, format the uplink transmission to include feedback information for one or more of the first downlink transmission or the second downlink transmission based on the determining, and transmit the uplink transmission to the base station.

The UE communications manager 615 may also receive a downlink grant associated with at least a first downlink transmission from a base station, the downlink grant including an indication of shared channel uplink resources for transmission of feedback information associated with the first downlink transmission, generate the feedback information for the first downlink transmission, and transmit the feedback information in an uplink transmission using the shared channel uplink resources based on the indication in the downlink grant.

The UE communications manager 615 may also identify first UCI associated with a first wireless service and second UCI associated with a second wireless service, where the first UCI and the second UCI are to be transmitted to a base station in a first uplink transmission, and where the first UCI has a first performance reliability parameter and the second UCI has a second performance reliability parameter that is different than the first performance reliability parameter. UE communications manager 615 may format the first UCI in accordance with the first performance reliability parameter and the second UCI in accordance with the second performance reliability parameter, multiplex the formatted first UCI and the formatted second UCI into the first uplink transmission, and transmit the first uplink transmission to the base station.

Transmitter 620 may transmit signals generated by other components of the device. In some examples, the transmitter 620 may be collocated with a receiver 610 in a transceiver module. For example, the transmitter 620 may be an example of aspects of the transceiver 935 described with reference to FIG. 9. The transmitter 620 may utilize a single antenna or a set of antennas.

Figure 7:
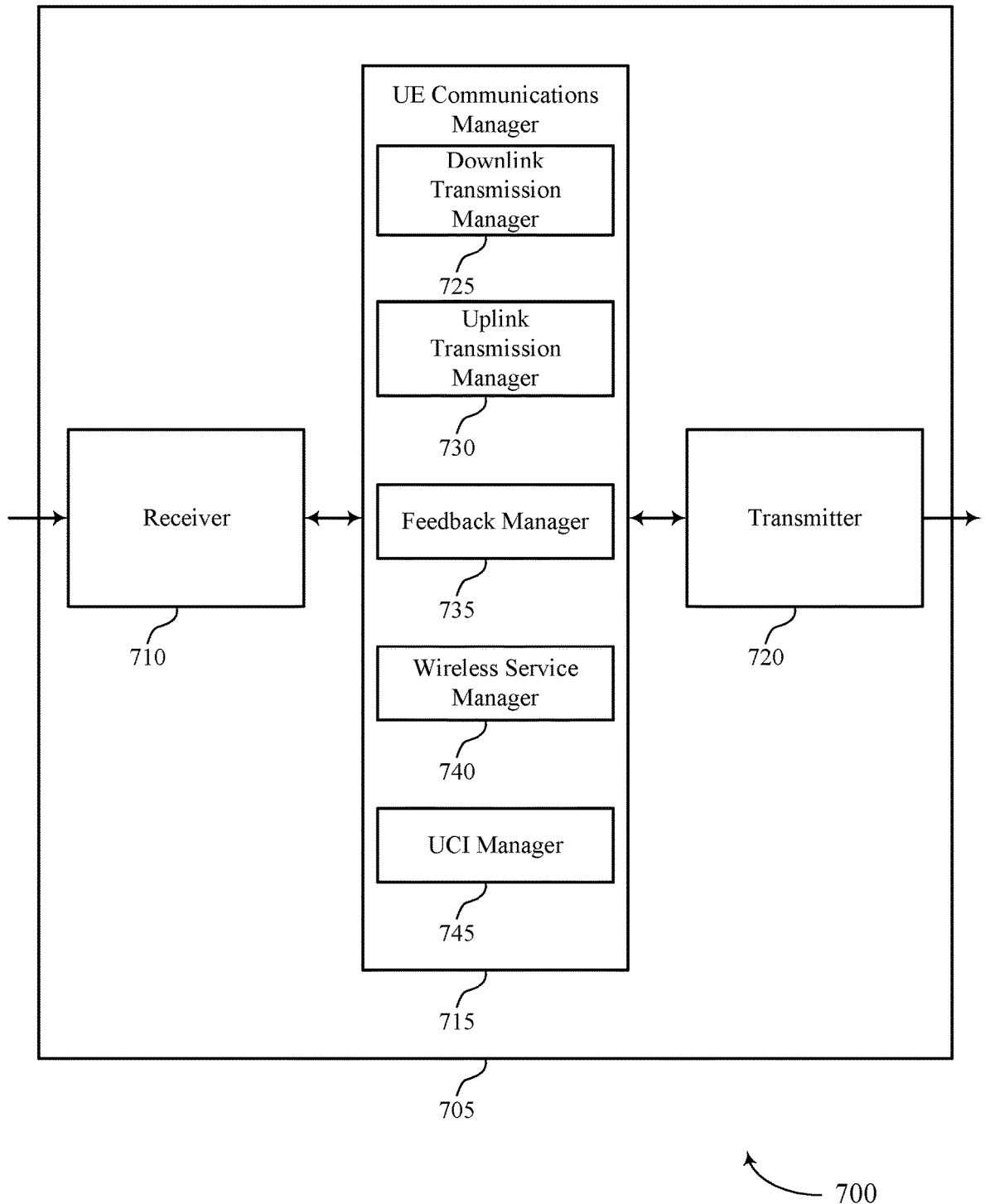

FIG. 7 shows a block diagram 700 of a wireless device 705 that supports control and data multiplexing in uplink wireless transmissions in accordance with aspects of the present disclosure. Wireless device 705 may be an example of aspects of a wireless device 605 or a UE 115 as described with reference to FIG. 6. Wireless device 705 may include receiver 710, UE communications manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to control and data multiplexing in uplink wireless transmissions, etc.). Information may be passed on to other components of the device. The receiver 710 may be an example of aspects of the transceiver 935 described with reference to FIG. 9. The receiver 710 may utilize a single antenna or a set of antennas.

UE communications manager 715 may be an example of aspects of the UE communications manager 915 described with reference to FIG. 9.

UE communications manager 715 may also include downlink transmission manager 725, uplink transmission manager 730, feedback manager 735, wireless service manager 740, and UCI manager 745.

Downlink transmission manager 725 may receive a set of downlink transmissions from a base station, receive prior to receiving the set of downlink transmissions, a downlink grant associated with at least a first downlink transmission, the downlink grant including an indication of shared channel uplink resources for transmission of feedback information associated with the first downlink transmission, and where the transmitting the uplink transmission includes transmitting the feedback information using the shared channel uplink resources based on the indication in the downlink grant. In some cases, downlink transmission manager 725 may receive at least a first downlink transmission from a base station, receive at least a second downlink transmission from the base station, receive, prior to receiving the first downlink transmission, a downlink grant associated with at least the first downlink transmission, the downlink grant including an indication of shared channel uplink resources for transmission of first feedback information associated with the first downlink transmission, and where the transmitting the uplink transmission includes transmitting the first feedback information using the shared channel uplink resources based on the indication in the downlink grant. In some examples, the indication of shared channel uplink resources includes at least a number of RBs of the uplink transmission allocated for transmission of the feedback information.

Uplink transmission manager 730 may receive an uplink grant associated with an uplink transmission from the UE to the base station, the uplink grant including an indication of a number of the set of downlink transmissions for which the UE is to transmit feedback information during the uplink transmission, the feedback information indicating successful or unsuccessful receipt of each downlink transmission. In some cases, feedback information in the uplink transmission may puncture a portion of the first uplink transmission that is outside of the uplink feedback resources inculcated in the uplink grant. In some examples, the indication of the number of the set of downlink transmissions is indicated in a DAI transmitted in the uplink grant. In some cases, the feedback information is transmitted in a PUSCH transmission with uplink data from the UE, where the uplink data is rate-matched around the feedback information. In some cases, the uplink grant further includes a grant of uplink feedback resources for transmission of feedback information associated with the set of downlink transmissions, and the UE may further determine whether the uplink feedback resources include resources for each of the set of downlink transmissions, and puncture a portion of the uplink transmission that is outside of the uplink feedback resources.

In some cases, the UE may determine a time difference between receiving the uplink grant and receiving the second downlink transmission, and determine whether the uplink feedback resources include resources for feedback information associated with the second downlink transmission based on the time difference. In some examples, the uplink feedback resources are determined to include resources for feedback information associated with the second downlink transmission when the time difference is below a threshold value and the uplink feedback resources are determined not to include resources for feedback information associated with the second downlink transmission when the time difference is at or above the threshold value. In some instances, the time difference corresponds to a difference in one or more of a number of subframes, a number of slots, a number of symbols, a number of mini-slots, or an absolute time between receiving the uplink grant and receiving the second downlink transmission. In some aspects, the feedback information is transmitted using the shared channel uplink resources irrespective of whether an uplink grant is received for the uplink transmission.

Feedback manager 735 may generate feedback information for the set of downlink transmissions, determine whether the uplink feedback resources include resources for feedback information associated with the second downlink transmission, and format the uplink transmission to include feedback information for one or more of the first downlink transmission or the second downlink transmission based on the determining. In some cases, the determining includes identifying an indication in a downlink grant associated with the second downlink transmission that indicates whether the uplink feedback resources include resources for feedback information associated with the second downlink transmission. In some examples, the indication includes an explicit indication that the uplink feedback resources include resources for feedback information associated with the second downlink transmission or an indication that the feedback information associated with the second downlink transmission is to be rate-matched around by other data of the uplink transmission. In some instances, the first UCI and the second UCI include feedback information indicating successful or unsuccessful reception of one or more downlink transmissions of each wireless service.

Wireless service manager 740 may identify, at the UE, first UCI associated with a first wireless service, and second UCI associated with a second wireless service, where the first UCI and the second UCI are to be transmitted to the base station in the uplink transmission, and where the first UCI has a first performance reliability parameter and the second UCI has a second performance reliability parameter that is different than the first performance reliability parameter.

UCI manager 745 may format the first UCI in accordance with the first performance reliability parameter and the second UCI, and multiplex the formatted first UCI and the formatted second UCI into the first uplink transmission. In some cases, the multiplexing includes frequency division multiplexing the formatted first UCI and the formatted second UCI into a PUSCH and a PUCCH. In some examples, the formatting includes independently encoding the formatted first UCI and the formatted second UCI. In some cases, the formatted first UCI is encoded using a first number of modulation symbols and the formatted second UCI is encoded using a second number of modulation symbols that is different than the first number of modulation symbols.

Transmitter 720 may transmit signals generated by other components of the device. In some examples, the transmitter 720 may be collocated with a receiver 710 in a transceiver module. For example, the transmitter 720 may be an example of aspects of the transceiver 935 described with reference to FIG. 9. The transmitter 720 may utilize a single antenna or a set of antennas.

Figure 8:
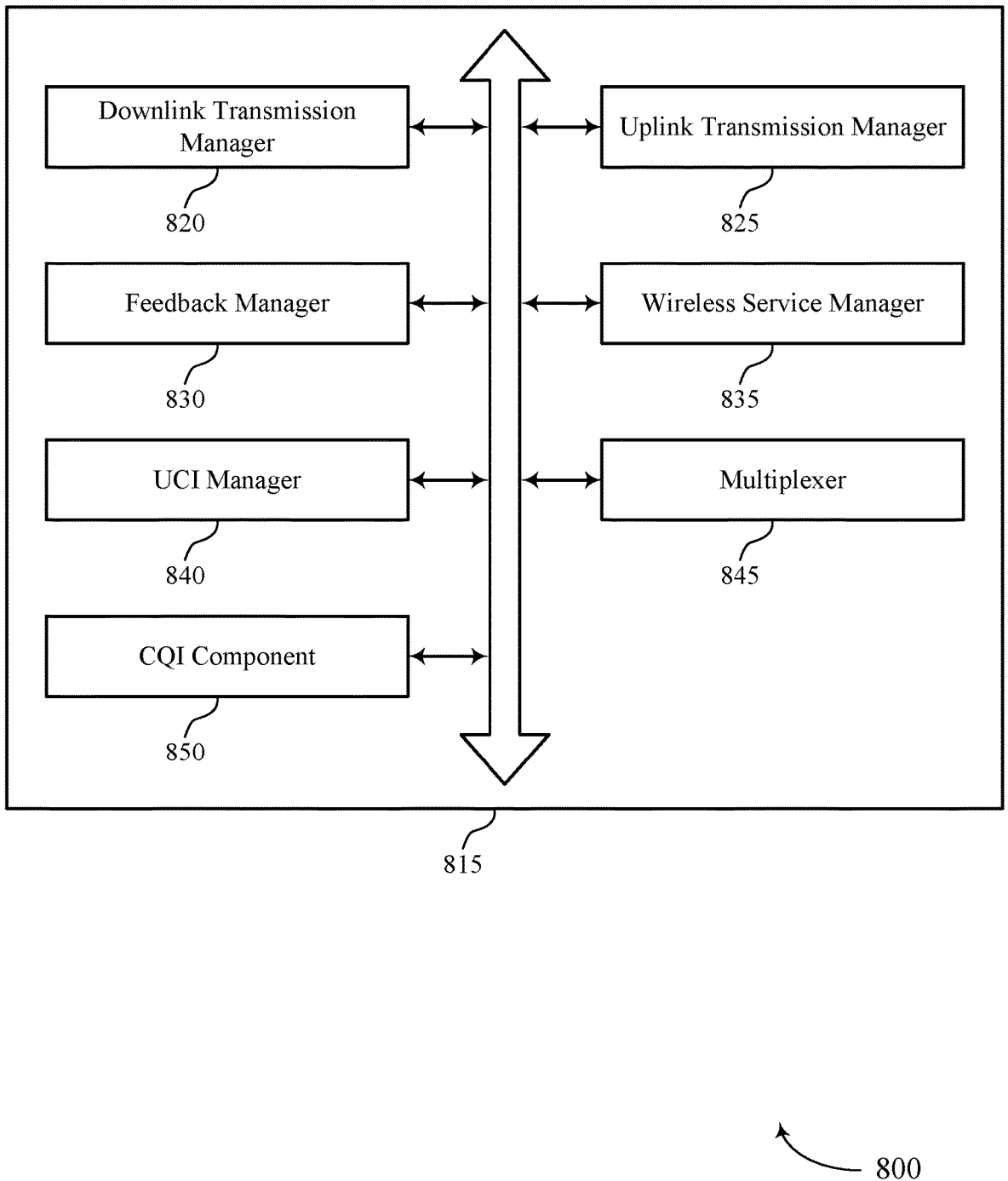

FIG. 8 shows a block diagram 800 of a UE communications manager 815 that supports control and data multiplexing in uplink wireless transmissions in accordance with aspects of the present disclosure. The UE communications manager 815 may be an example of aspects of a UE communications manager 615, a UE communications manager 715, or a UE communications manager 915 described with reference to FIGS. 6, 7, and 9. The UE communications manager 815 may include downlink transmission manager 820, uplink transmission manager 825, feedback manager 830, wireless service manager 835, UCI manager 840, multiplexer 845, and CQI component 850. Each of these modules may communicate, directly or indirectly, with one another (e.g., via one or more buses).

Downlink transmission manager 820 may receive a set of downlink transmissions from a base station, receive prior to receiving the set of downlink transmissions, a downlink grant associated with at least a first downlink transmission, the downlink grant including an indication of shared channel uplink resources for transmission of feedback information associated with the first downlink transmission, and where the transmitting the uplink transmission includes transmitting the feedback information using the shared channel uplink resources based on the indication in the downlink grant. In some cases, downlink transmission manager 820 may receive at least a first downlink transmission from a base station, receive at least a second downlink transmission from the base station, receive, prior to receiving the first downlink transmission, a downlink grant associated with at least the first downlink transmission, the downlink grant including an indication of shared channel uplink resources for transmission of first feedback information associated with the first downlink transmission, and where the transmitting the uplink transmission includes transmitting the first feedback information using the shared channel uplink resources based on the indication in the downlink grant. In some examples, the indication of shared channel uplink resources includes at least a number of RBs of the uplink transmission allocated for transmission of the feedback information.

Uplink transmission manager 825 may receive an uplink grant associated with an uplink transmission from the UE to the base station, the uplink grant including an indication of a number of the set of downlink transmissions for which the UE is to transmit feedback information during the uplink transmission, the feedback information indicating successful or unsuccessful receipt of each downlink transmission. In some cases, feedback information in the uplink transmission may puncture a portion of the first uplink transmission that is outside of the uplink feedback resources inculcated in the uplink grant. In some cases, the indication of the number of the set of downlink transmissions is indicated in a DAI transmitted in the uplink grant. In some examples, the feedback information is transmitted in a PUSCH transmission with uplink data from the UE, where the uplink data is rate-matched around the feedback information. In some instances, the uplink grant further includes a grant of uplink feedback resources for transmission of feedback information associated with the set of downlink transmissions, and the UE may further determine whether the uplink feedback resources include resources for each of the set of downlink transmissions, and puncture a portion of the uplink transmission that is outside of the uplink feedback resources.

In some cases, the UE may determine a time difference between receiving the uplink grant and receiving the second downlink transmission, and determine whether the uplink feedback resources include resources for feedback information associated with the second downlink transmission based on the time difference. In some examples, the uplink feedback resources are determined to include resources for feedback information associated with the second downlink transmission when the time difference is below a threshold value and the uplink feedback resources are determined not to include resources for feedback information associated with the second downlink transmission when the time difference is at or above the threshold value. In some instances, the time difference corresponds to a difference in one or more of a number of subframes, a number of slots, a number of symbols, a number of mini-slots, or an absolute time between receiving the uplink grant and receiving the second downlink transmission. In some cases, the feedback information is transmitted using the shared channel uplink resources irrespective of whether an uplink grant is received for the uplink transmission.

Feedback manager 830 may generate feedback information for the set of downlink transmissions, determine whether the uplink feedback resources include resources for feedback information associated with the second downlink transmission, and format the uplink transmission to include feedback information for one or more of the first downlink transmission or the second downlink transmission based on the determining. In some cases, the determining includes identifying an indication in a downlink grant associated with the second downlink transmission that indicates whether the uplink feedback resources include resources for feedback information associated with the second downlink transmission. In some cases, the indication includes an explicit indication that the uplink feedback resources include resources for feedback information associated with the second downlink transmission or an indication that the feedback information associated with the second downlink transmission is to be rate-matched around by other data of the uplink transmission. In some cases, the first UCI and the second UCI include feedback information indicating successful or unsuccessful reception of one or more downlink transmissions of each wireless service.

Wireless service manager 835 may identify, at the UE, first UCI associated with a first wireless service, and second UCI associated with a second wireless service, where the first UCI and the second UCI are to be transmitted to the base station in the uplink transmission, and where the first UCI has a first performance reliability parameter and the second UCI has a second performance reliability parameter that is different than the first performance reliability parameter.

UCI manager 840 may format the first UCI in accordance with the first performance reliability parameter and the second UCI, and multiplex the formatted first UCI and the formatted second UCI into the first uplink transmission. In some cases, the multiplexing includes frequency division multiplexing the formatted first UCI and the formatted second UCI into a PUSCH and a PUCCH. In some cases, the formatting includes independently encoding the formatted first UCI and the formatted second UCI. In some examples, the formatted first UCI is encoded using a first number of modulation symbols and the formatted second UCI is encoded using a second number of modulation symbols that is different than the first number of modulation symbols.

Multiplexer 845 may multiplex the formatted first UCI and the formatted second UCI into the uplink transmission. In some cases, the multiplexing includes time division multiplexing the formatted first UCI and the formatted second UCI into a PUCCH. CQI component 850 may identify the first UCI and the second UCI when CQI associated with each wireless service is to be transmitted.

Figure 9:
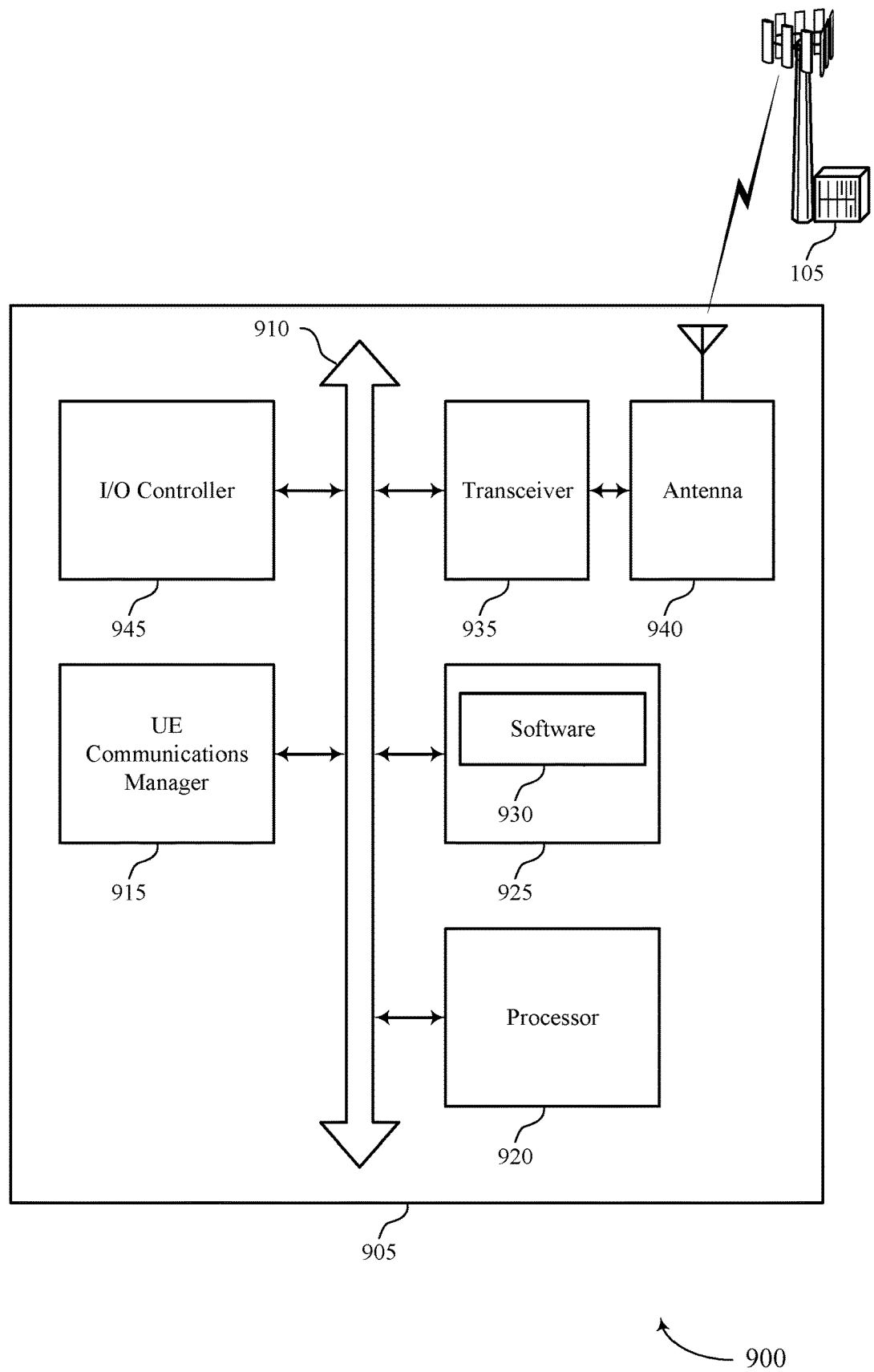
FIG. 9 illustrates a block diagram of a system including a UE that supports control and data multiplexing in uplink wireless transmissions in accordance with aspects of the present disclosure.

FIG. 9 shows a diagram of a system 900 including a device 905 that supports control and data multiplexing in uplink wireless transmissions in accordance with aspects of the present disclosure. Device 905 may be an example of or include the components of wireless device 605, wireless device 705, or a UE 115 as described above, e.g., with reference to FIGS. 6 and 7. Device 905 may include components for bi-directional voice and data communications including components for transmitting and receiving communications, including UE communications manager 915, processor 920, memory 925, software 930, transceiver 935, antenna 940, and I/O controller 945. These components may be in electronic communication via one or more buses (e.g., bus 910). Device 905 may communicate wirelessly with one or more base stations 105.

Processor 920 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting control and data multiplexing in uplink wireless transmissions).

Memory 925 may include random access memory (RAM) and read only memory (ROM). The memory 925 may store computer-readable, computer-executable software 930 including instructions that, when executed, cause the processor to perform various functions described herein. In some cases, the memory 925 may contain, among other things, a basic input/output system (BIOS) which may control basic hardware or software operation such as the interaction with peripheral components or devices.

Software 930 may include code to implement aspects of the present disclosure, including code to support control and data multiplexing in uplink wireless transmissions. Software 930 may be stored in a non-transitory computer-readable medium such as system memory or other memory. In some cases, the software 930 may not be directly executable by the processor but may cause a computer (e.g., when compiled and executed) to perform functions described herein.

Transceiver 935 may communicate bi-directionally, via one or more antennas, wired, or wireless links as described above. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas.

In some cases, the wireless device may include a single antenna 940. However, in some cases the device may have more than one antenna 940, which may be capable of concurrently transmitting or receiving multiple wireless transmissions.

I/O controller 945 may manage input and output signals for device 905. I/O controller 945 may also manage peripherals not integrated into device 905. In some cases, I/O controller 945 may represent a physical connection or port to an external peripheral. In some cases, I/O controller 945 may utilize an operating system such as iOS®, ANDROID®, MS-DOS®, MS-WINDOWS®, OS/2®, UNIX®, LINUX®, or another known operating system. In other cases, I/O controller 945 may represent or interact with a modem, a keyboard, a mouse, a touchscreen, or a similar device. In some cases, I/O controller 945 may be implemented as part of a processor. In some cases, a user may interact with device 905 via I/O controller 945 or via hardware components controlled by I/O controller 945.

Figure 10:
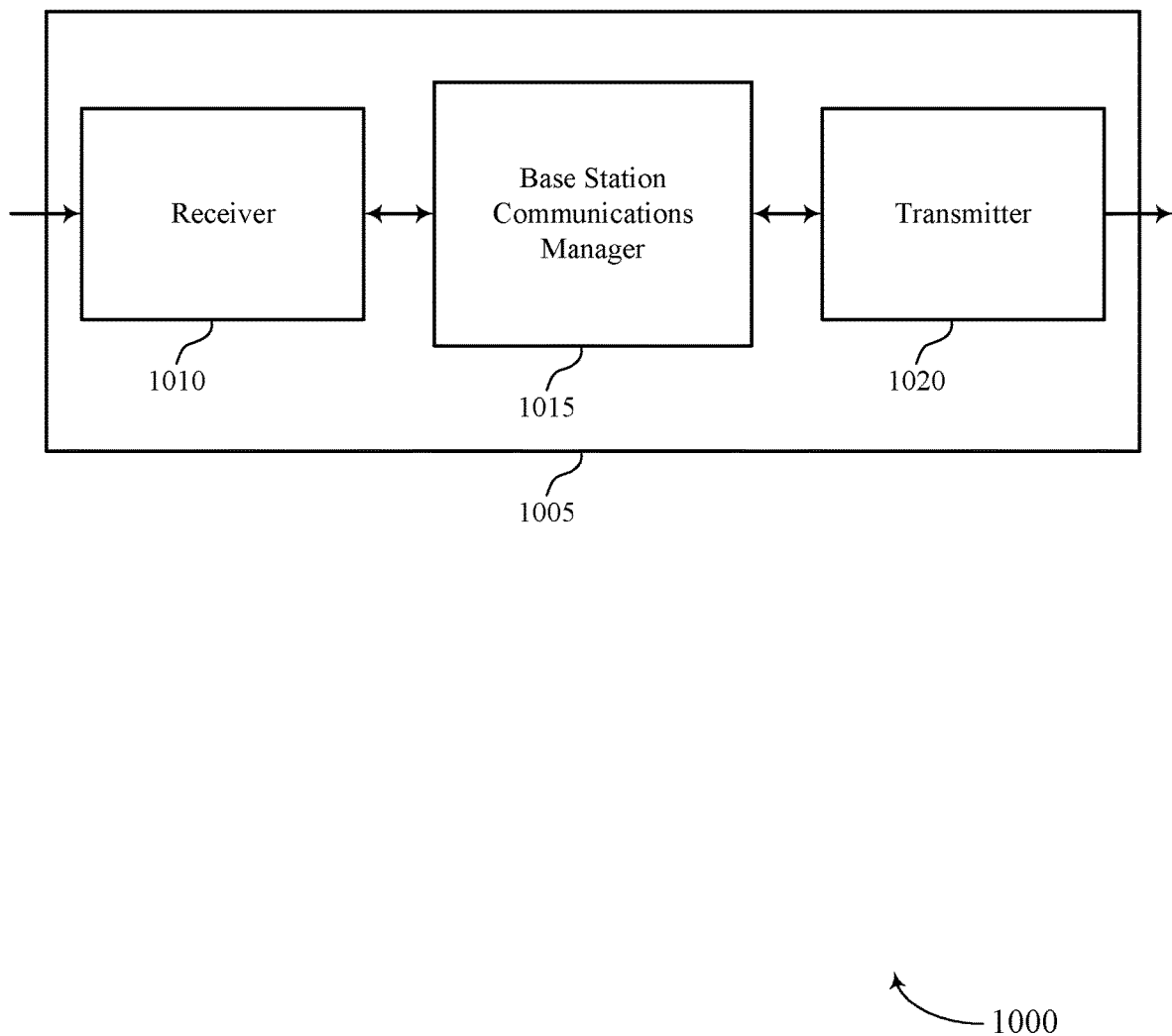
FIGS. 10 through 12 show block diagrams of a device that supports control and data multiplexing in uplink wireless transmissions in accordance with aspects of the present disclosure.

FIG. 10 shows a block diagram 1000 of a wireless device 1005 that supports control and data multiplexing in uplink wireless transmissions in accordance with aspects of the present disclosure. Wireless device 1005 may be an example of aspects of a base station 105 as described herein. Wireless device 1005 may include receiver 1010, base station communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to control and data multiplexing in uplink wireless transmissions, etc.). Information may be passed on to other components of the device. The receiver 1010 may be an example of aspects of the transceiver 1335 described with reference to FIG. 13. The receiver 1010 may utilize a single antenna or a set of antennas.

Base station communications manager 1015 may be an example of aspects of the base station communications manager 1315 described with reference to FIG. 13.

Base station communications manager 1015 and/or at least some of its various sub-components may be implemented in hardware, software executed by a processor, firmware, or any combination thereof. If implemented in software executed by a processor, the functions of the base station communications manager 1015 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The base station communications manager 1015 and/or at least some of its various sub-components may be physically located at various positions, including being distributed such that portions of functions are implemented at different physical locations by one or more physical devices. In some examples, base station communications manager 1015 and/or at least some of its various sub-components may be a separate and distinct component in accordance with various aspects of the present disclosure. In other examples, base station communications manager 1015 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 1015 may transmit a set of downlink transmissions to a UE, transmit, to the UE, an uplink grant for an uplink transmission from the UE to the base station, the uplink grant including an indication of a number of the set of downlink transmissions for which the UE is to transmit feedback information during the uplink transmission, the feedback information indicating successful or unsuccessful receipt of each downlink transmission, and receive the uplink transmission from the UE.

The base station communications manager 1015 may also transmit at least a first downlink transmission to a UE, transmit, to the UE, an uplink grant for an uplink transmission from the UE to the base station, the uplink grant including an indication of uplink feedback resources for transmission of feedback information associated with at least the first downlink transmission, the feedback information indicating successful or unsuccessful receipt of at least the first downlink transmission, transmit, to the UE, at least a second downlink transmission, determine whether the uplink feedback resources include resources for the second downlink transmission, receive the uplink transmission from the UE, and identify the feedback information for the first downlink transmission and the second downlink transmission based on the determining.

The base station communications manager 1015 may also transmit a downlink grant associated with at least a first downlink transmission from the base station, the downlink grant including an indication of shared channel uplink resources for use in transmission of feedback information associated with the first downlink transmission irrespective of whether the UE receives an uplink grant for an uplink transmission, transmit the uplink grant to the UE, the uplink grant including one or more parameters for the shared channel uplink resources for an uplink transmission containing the feedback information, and receive the feedback information from the UE in the uplink transmission.

The base station communications manager 1015 may also configure a UE with a first wireless service for communications between the UE and a base station and a second wireless service for communications between the UE and the base station, where the first wireless service has a first performance reliability parameter and the second wireless service has a second performance reliability parameter that is different than the first performance reliability parameter, receive, in a first uplink transmission from the UE, first UCI associated with the first wireless service established, and second UCI associated with the second wireless service, where the first UCI is formatted in accordance with the first performance reliability parameter and the second UCI is formatted in accordance with the second performance reliability parameter, and where the first UCI is multiplexed with the second UCI in the first uplink transmission, and decode the first UCI and the second UCI based on the first reliability parameter and the second reliability parameter.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1335 described with reference to FIG. 13. The transmitter 1020 may utilize a single antenna or a set of antennas.

Figure 11:
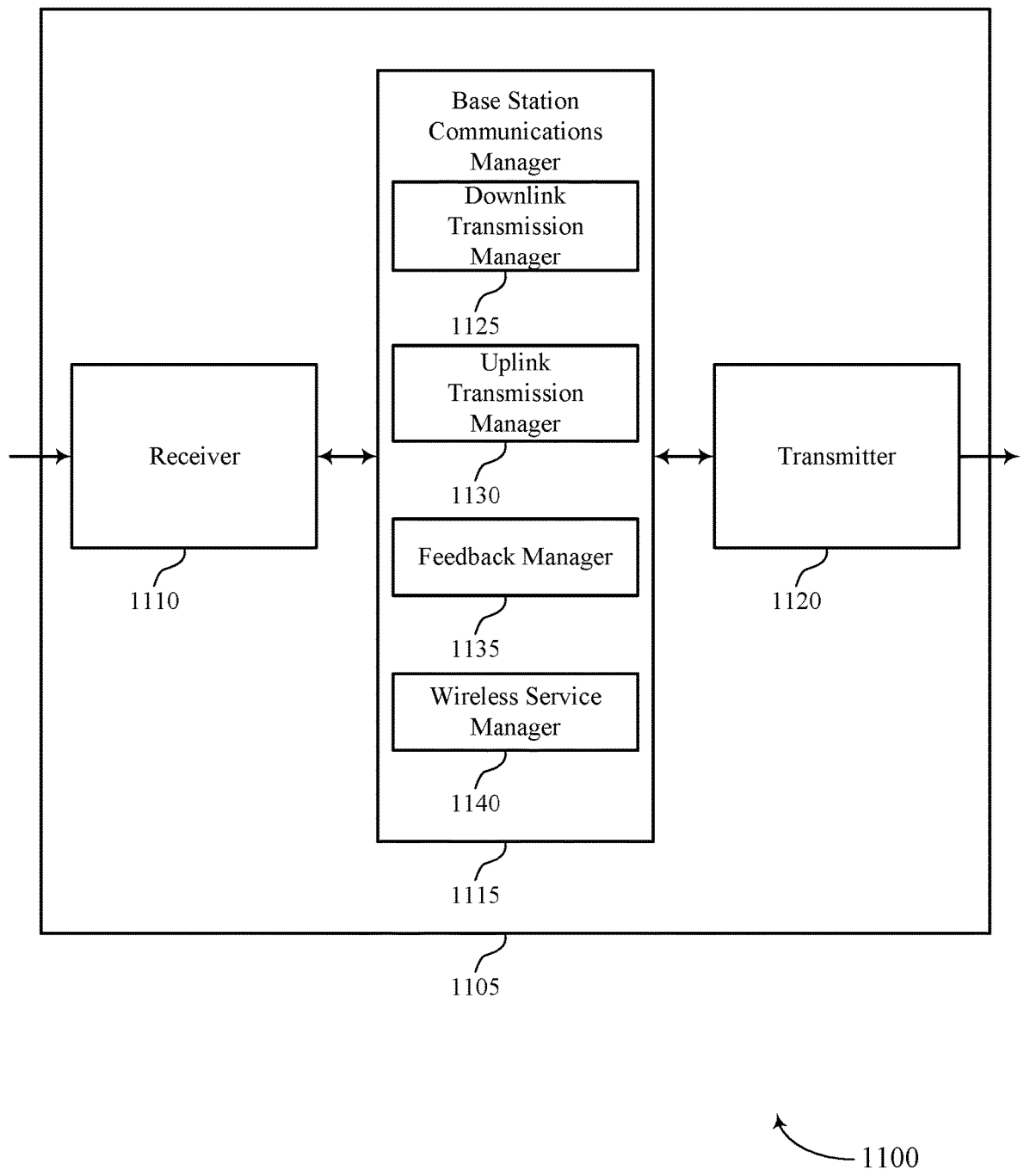

FIG. 11 shows a block diagram 1100 of a wireless device 1105 that supports control and data multiplexing in uplink wireless transmissions in accordance with aspects of the present disclosure. Wireless device 1105 may be an example of aspects of a wireless device 1005 or a base station 105 as described with reference to FIG. 10. Wireless device 1105 may include receiver 1110, base station communications manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to control and data multiplexing in uplink wireless transmissions). Information may be passed on to other components of the device. The receiver 1110 may be an example of aspects of the transceiver 1335 described with reference to FIG. 13. The receiver 1110 may utilize a single antenna or a set of antennas.

Base station communications manager 1115 may be an example of aspects of the base station communications manager 1315 described with reference to FIG. 13.

Base station communications manager 1115 may also include downlink transmission manager 1125, uplink transmission manager 1130, feedback manager 1135, and wireless service manager 1140.

Downlink transmission manager 1125 may transmit a set of downlink transmissions to a UE, and transmit a downlink grant associated with at least a first downlink transmission from the base station, the downlink grant including an indication of shared channel uplink resources for use in transmission of feedback information associated with the first downlink transmission irrespective of whether the UE receives an uplink grant for an uplink transmission. In some cases, downlink transmission manager 1125 may transmit the uplink grant to the UE, the uplink grant including one or more parameters for the shared channel uplink resources for an uplink transmission containing the feedback information. In some examples, the indication of the number of the set of downlink transmissions is indicated in a DAI transmitted in the uplink grant. In some cases, a downlink grant for the second downlink transmission includes an indication of whether the uplink feedback resources include resources for feedback information associated with the second downlink transmission.

Uplink transmission manager 1130 may transmit, to the UE, an uplink grant for an uplink transmission from the UE to the base station, the uplink grant including an indication of a number of the set of downlink transmissions for which the UE is to transmit feedback information during the uplink transmission. In some cases, uplink transmission manager 1130 may receive the feedback information or UCI from the UE in the uplink transmission. In some cases, UCI formatting includes independently encoding the formatted first UCI and the formatted second UCI. In some examples, the indication of shared channel uplink resources includes at least a number of RBs of the uplink transmission allocated for transmission of the feedback information. In some instances, the formatted first UCI and the formatted second UCI are multiplexed according to frequency division multiplexing into a PUSCH and a PUCCH. In some cases, the formatted first UCI and the formatted second UCI are multiplexed according to time division multiplexing into a PUCCH.

Feedback manager 1135 may determine whether the uplink feedback resources include resources for the second downlink transmission and identify the feedback information for the first downlink transmission and the second downlink transmission based on the determining. In some cases, the feedback information is transmitted in a PUSCH transmission with uplink data from the UE, where the uplink data is rate-matched around the feedback information. In some examples, the uplink feedback resources are determined to include resources for feedback information associated with the second downlink transmission when a time difference between an uplink grant and a downlink grant is below a threshold value and the uplink feedback resources are determined not to include resources for feedback information associated with the second downlink transmission when the time difference is at or above the threshold value. In some instances, the time difference corresponds to a difference in one or more of a number of subframes, a number of slots, a number of symbols, a number of mini-slots, or an absolute time between receiving the uplink grant and receiving the second downlink transmission. In some aspects, the feedback information is transmitted using the shared channel uplink resources irrespective of whether an uplink grant is received for the uplink transmission. In some cases, the first UCI and the second UCI include feedback information indicating successful or unsuccessful reception of one or more downlink transmissions of each wireless service.

Wireless service manager 1140 may configure a UE with a first wireless service for communications between the UE and a base station and a second wireless service for communications between the UE and the base station, where the first wireless service has a first performance reliability parameter and the second wireless service has a second performance reliability parameter that is different than the first performance reliability parameter.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1335 described with reference to FIG. 13. The transmitter 1120 may utilize a single antenna or a set of antennas.

Figure 12:
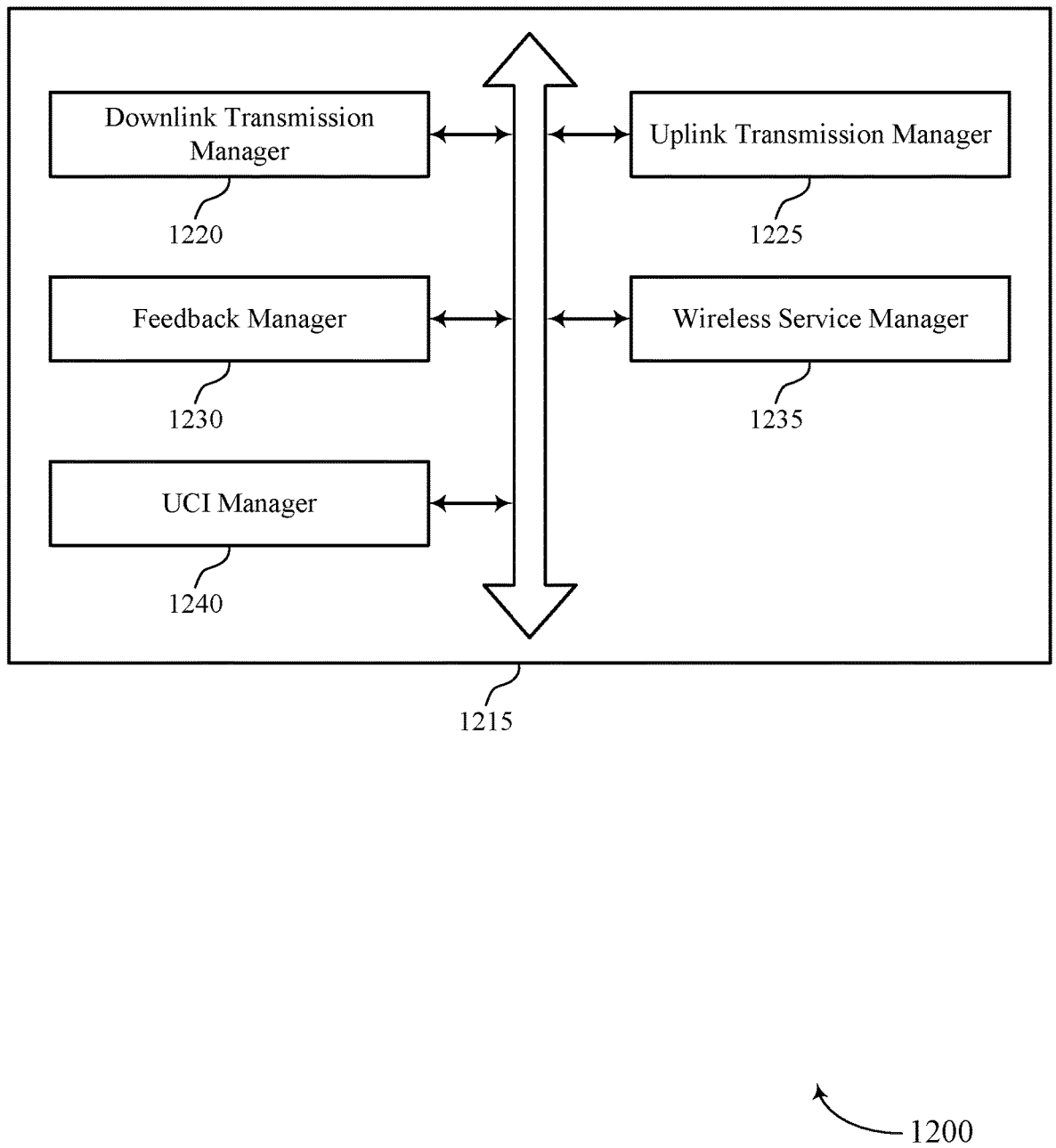

FIG. 12 shows a block diagram 1200 of a base station communications manager 1215 that supports control and data multiplexing in uplink wireless transmissions in accordance with aspects of the present disclosure. The base station communications manager 1215 may be an example of aspects of a base station communications manager 1315 described with reference to FIGS. 10, 11, and 13. The base station communications manager 1215 may include downlink transmission manager 1220, uplink transmission manager 1225, feedback manager 1230, wireless service manager 1235, and UCI manager 1240. Each of these modules may communicate, directly or indirectly, with one another (e.g., via one or more buses).

Downlink transmission manager 1220 may transmit a set of downlink transmissions to a UE, and transmit a downlink grant associated with at least a first downlink transmission from the base station, the downlink grant including an indication of shared channel uplink resources for use in transmission of feedback information associated with the first downlink transmission irrespective of whether the UE receives an uplink grant for an uplink transmission. In some cases, downlink transmission manager 1220 may transmit the uplink grant to the UE, the uplink grant including one or more parameters for the shared channel uplink resources for an uplink transmission containing the feedback information. In some examples, the indication of the number of the set of downlink transmissions is indicated in a DAI transmitted in the uplink grant. In some cases, a downlink grant for the second downlink transmission includes an indication of whether the uplink feedback resources include resources for feedback information associated with the second downlink transmission.

Uplink transmission manager 1225 may transmit, to the UE, an uplink grant for an uplink transmission from the UE to the base station, the uplink grant including an indication of a number of the set of downlink transmissions for which the UE is to transmit feedback information during the uplink transmission. In some cases, uplink transmission manager 1225 may receive the feedback information or UCI from the UE in the uplink transmission. In some examples, UCI formatting includes independently encoding the formatted first UCI and the formatted second UCI. In some instances, the indication of shared channel uplink resources includes at least a number of RBs of the uplink transmission allocated for transmission of the feedback information. In some aspects, the formatted first UCI and the formatted second UCI are multiplexed according to frequency division multiplexing into a PUSCH and a PUCCH. In some cases, the formatted first UCI and the formatted second UCI are multiplexed according to time division multiplexing into a PUCCH.

Feedback manager may determine whether the uplink feedback resources include resources for the second downlink transmission and identify the feedback information for the first downlink transmission and the second downlink transmission based on the determining. In some cases, the feedback information is transmitted in a PUSCH transmission with uplink data from the UE, where the uplink data is rate-matched around the feedback information. In some examples, the uplink feedback resources are determined to include resources for feedback information associated with the second downlink transmission when a time difference between an uplink grant and a downlink grant is below a threshold value and the uplink feedback resources are determined not to include resources for feedback information associated with the second downlink transmission when the time difference is at or above the threshold value. In some instances, the time difference corresponds to a difference in one or more of a number of subframes, a number of slots, a number of symbols, a number of mini-slots, or an absolute time between receiving the uplink grant and receiving the second downlink transmission. In some aspects, the feedback information is transmitted using the shared channel uplink resources irrespective of whether an uplink grant is received for the uplink transmission. In some cases, the first UCI and the second UCI include feedback information indicating successful or unsuccessful reception of one or more downlink transmissions of each wireless service.

Wireless service manager 1235 may configure a UE with a first wireless service for communications between the UE and a base station and a second wireless service for communications between the UE and the base station, where the first wireless service has a first performance reliability parameter and the second wireless service has a second performance reliability parameter that is different than the first performance reliability parameter.

UCI manager 1240 may read formatted first UCI and formatted second UCI that are independently encoded. In some cases, the first UCI and the second UCI include CQI associated with each wireless service.

Figure 13:
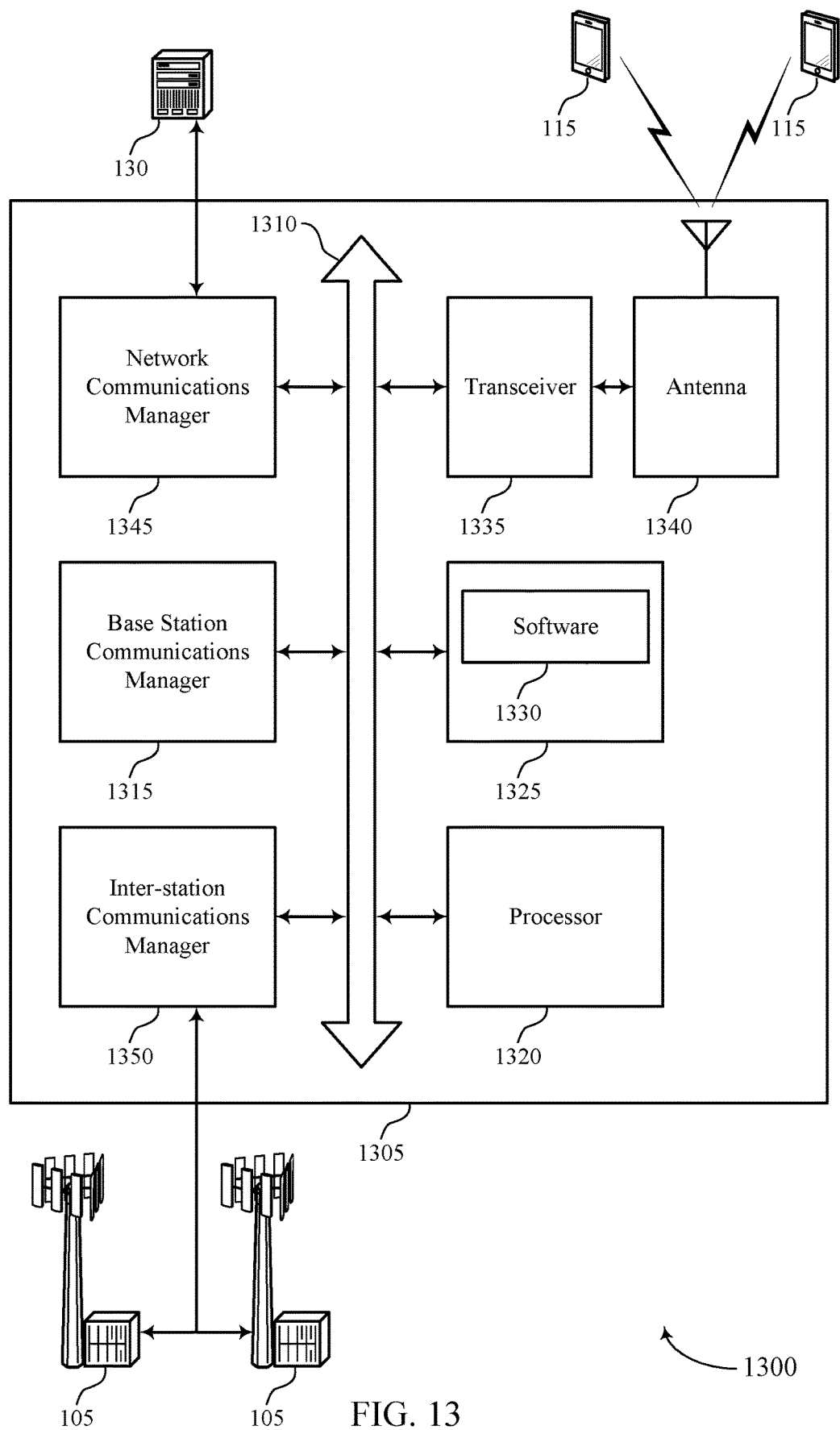
FIG. 13 illustrates a block diagram of a system including a base station that supports control and data multiplexing in uplink wireless transmissions in accordance with aspects of the present disclosure.

FIG. 13 shows a diagram of a system 1300 including a device 1305 that supports control and data multiplexing in uplink wireless transmissions in accordance with aspects of the present disclosure. Device 1305 may be an example of or include the components of base station 105 as described above, e.g., with reference to FIG. 1. Device 1305 may include components for bi-directional voice and data communications including components for transmitting and receiving communications, including base station communications manager 1315, processor 1320, memory 1325, software 1330, transceiver 1335, antenna 1340, network communications manager 1345, and inter-station communications manager 1350. These components may be in electronic communication via one or more buses (e.g., bus 1310). Device 1305 may communicate wirelessly with one or more UEs 115.

Processor 1320 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1320 may be configured to operate a memory array using a memory controller. In other cases, a memory controller may be integrated into processor 1320. Processor 1320 may be configured to execute computer-readable instructions stored in a memory to perform various functions (e.g., functions or tasks supporting control and data multiplexing in uplink wireless transmissions).

Memory 1325 may include RAM and ROM. The memory 1325 may store computer-readable, computer-executable software 1330 including instructions that, when executed, cause the processor to perform various functions described herein. In some cases, the memory 1325 may contain, among other things, a BIOS which may control basic hardware or software operation such as the interaction with peripheral components or devices.

Software 1330 may include code to implement aspects of the present disclosure, including code to support control and data multiplexing in uplink wireless transmissions. Software 1330 may be stored in a non-transitory computer-readable medium such as system memory or other memory. In some cases, the software 1330 may not be directly executable by the processor but may cause a computer (e.g., when compiled and executed) to perform functions described herein.

Transceiver 1335 may communicate bi-directionally, via one or more antennas, wired, or wireless links as described above. For example, the transceiver 1335 may represent a wireless transceiver and may communicate bi-directionally with another wireless transceiver. The transceiver 1335 may also include a modem to modulate the packets and provide the modulated packets to the antennas for transmission, and to demodulate packets received from the antennas.

In some cases, the wireless device may include a single antenna 1340. However, in some cases the device may have more than one antenna 1340, which may be capable of concurrently transmitting or receiving multiple wireless transmissions.

Network communications manager 1345 may manage communications with the core network (e.g., via one or more wired backhaul links). For example, the network communications manager 1345 may manage the transfer of data communications for client devices, such as one or more UEs 115.

Inter-station communications manager 1350 may manage communications with other base station 105, and may include a controller or scheduler for controlling communications with UEs 115 in cooperation with other base stations 105. For example, the inter-station communications manager 1350 may coordinate scheduling for transmissions to UEs 115 for various interference mitigation techniques such as beamforming or joint transmission. In some examples, inter-station communications manager 1350 may provide an X2 interface within an LTE/LTE-A wireless communication network technology to provide communication between base stations 105.

Figure 14:
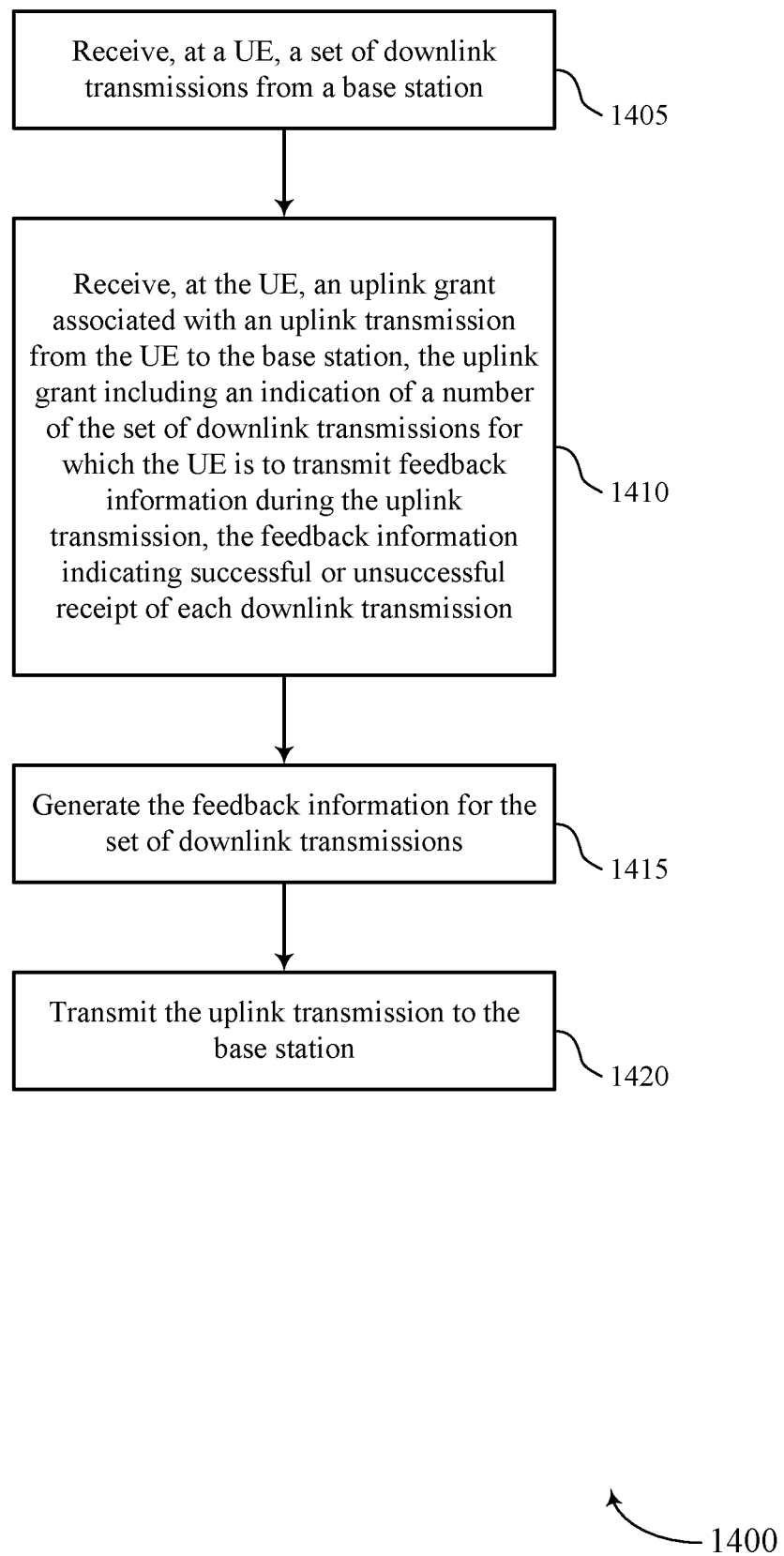
FIGS. 14 through 21 illustrate methods for control and data multiplexing in uplink wireless transmissions in accordance with aspects of the present disclosure.

FIG. 14 shows a flowchart illustrating a method 1400 for control and data multiplexing in uplink wireless transmissions in accordance with aspects of the present disclosure. The operations of method 1400 may be implemented by a UE 115 or its components as described herein. For example, the operations of method 1400 may be performed by a UE communications manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At block 1405 the UE 115 may receive a plurality of downlink transmissions from a base station. The operations of block 1405 may be performed according to the methods described herein. In certain examples, aspects of the operations of block 1405 may be performed by a downlink transmission manager as described with reference to FIGS. 6 through 9.

At block 1410 the UE 115 may receive an uplink grant associated with an uplink transmission from the UE to the base station, the uplink grant comprising an indication of a number of the plurality of downlink transmissions for which the UE is to transmit feedback information during the uplink transmission, the feedback information indicating successful or unsuccessful receipt of each downlink transmission. The operations of block 1410 may be performed according to the methods described herein. In certain examples, aspects of the operations of block 1410 may be performed by a uplink transmission manager as described with reference to FIGS. 6 through 9.

At block 1415 the UE 115 may generate the feedback information for the plurality of downlink transmissions. The operations of block 1415 may be performed according to the methods described herein. In certain examples, aspects of the operations of block 1415 may be performed by a feedback manager as described with reference to FIGS. 6 through 9.

At block 1420 the UE 115 may transmit the uplink transmission to the base station. The operations of block 1420 may be performed according to the methods described herein. In certain examples, aspects of the operations of block 1420 may be performed by a uplink transmission manager as described with reference to FIGS. 6 through 9.

Figure 15:
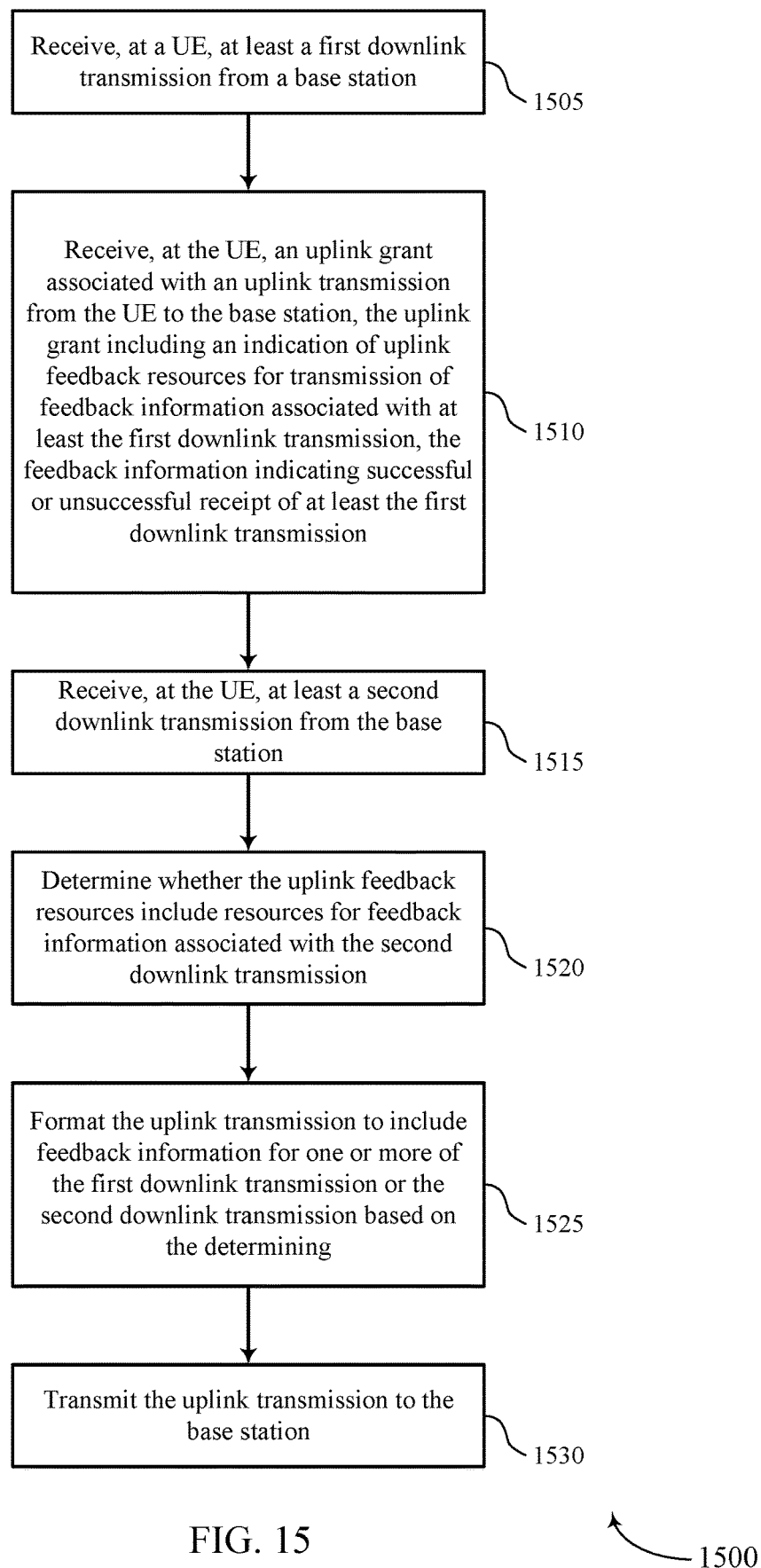

FIG. 15 shows a flowchart illustrating a method 1500 for control and data multiplexing in uplink wireless transmissions in accordance with aspects of the present disclosure. The operations of method 1500 may be implemented by a UE 115 or its components as described herein. For example, the operations of method 1500 may be performed by a UE communications manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At block 1505 the UE 115 may receive at least a first downlink transmission from a base station. The operations of block 1505 may be performed according to the methods described herein. In certain examples, aspects of the operations of block 1505 may be performed by a downlink transmission manager as described with reference to FIGS. 6 through 9.

At block 1510 the UE 115 may receive an uplink grant associated with an uplink transmission from the UE to the base station, the uplink grant comprising an indication of uplink feedback resources for transmission of feedback information associated with at least the first downlink transmission, the feedback information indicating successful or unsuccessful receipt of at least the first downlink transmission. The operations of block 1510 may be performed according to the methods described herein. In certain examples, aspects of the operations of block 1510 may be performed by a uplink transmission manager as described with reference to FIGS. 6 through 9.

At block 1515 the UE 115 may receive at least a second downlink transmission from the base station. The operations of block 1515 may be performed according to the methods described herein. In certain examples, aspects of the operations of block 1515 may be performed by a downlink transmission manager as described with reference to FIGS. 6 through 9.

At block 1520 the UE 115 may determine whether the uplink feedback resources include resources for feedback information associated with the second downlink transmission. The operations of block 1520 may be performed according to the methods described herein. In certain examples, aspects of the operations of block 1520 may be performed by a feedback manager as described with reference to FIGS. 6 through 9.

At block 1525 the UE 115 may format the uplink transmission to include feedback information for one or more of the first downlink transmission or the second downlink transmission based at least in part on the determining. The operations of block 1525 may be performed according to the methods described herein. In certain examples, aspects of the operations of block 1525 may be performed by a feedback manager as described with reference to FIGS. 6 through 9.

At block 1530 the UE 115 may transmit the uplink transmission to the base station. The operations of block 1530 may be performed according to the methods described herein. In certain examples, aspects of the operations of block 1530 may be performed by a uplink transmission manager as described with reference to FIGS. 6 through 9.

Figure 16:
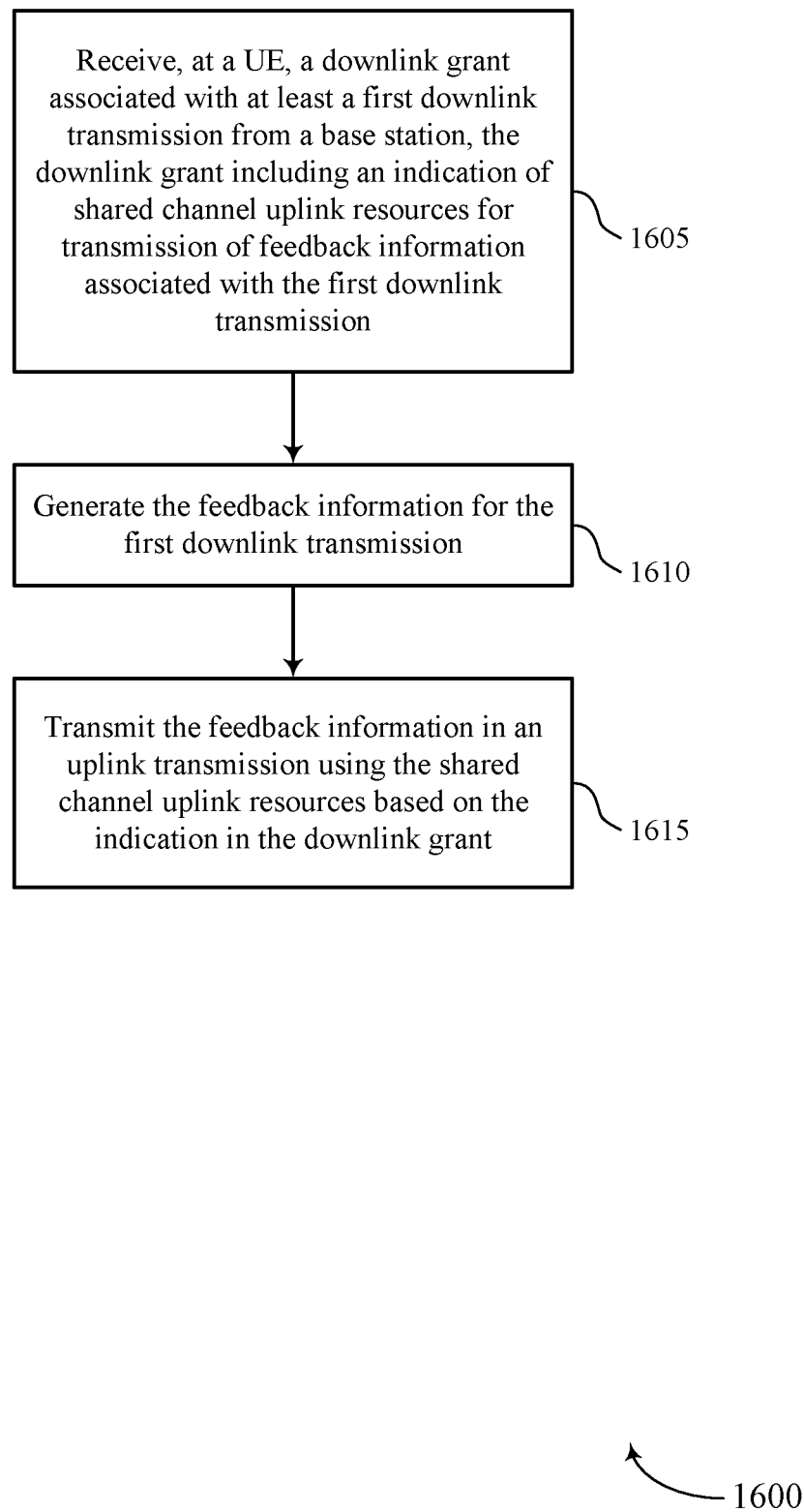

FIG. 16 shows a flowchart illustrating a method 1600 for control and data multiplexing in uplink wireless transmissions in accordance with aspects of the present disclosure. The operations of method 1600 may be implemented by a UE 115 or its components as described herein. For example, the operations of method 1600 may be performed by a UE communications manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At block 1605 the UE 115 may receive a downlink grant associated with at least a first downlink transmission from a base station, the downlink grant comprising an indication of shared channel uplink resources for transmission of feedback information associated with the first downlink transmission. The operations of block 1605 may be performed according to the methods described herein. In certain examples, aspects of the operations of block 1605 may be performed by a downlink transmission manager as described with reference to FIGS. 6 through 9.

At block 1610 the UE 115 may generate the feedback information for the first downlink transmission. The operations of block 1610 may be performed according to the methods described herein. In certain examples, aspects of the operations of block 1610 may be performed by a feedback manager as described with reference to FIGS. 6 through 9.

At block 1615 the UE 115 may transmit the feedback information in an uplink transmission using the shared channel uplink resources based at least in part on the indication in the downlink grant. The operations of block 1615 may be performed according to the methods described herein. In certain examples, aspects of the operations of block 1615 may be performed by a uplink transmission manager as described with reference to FIGS. 6 through 9.

Figure 17:
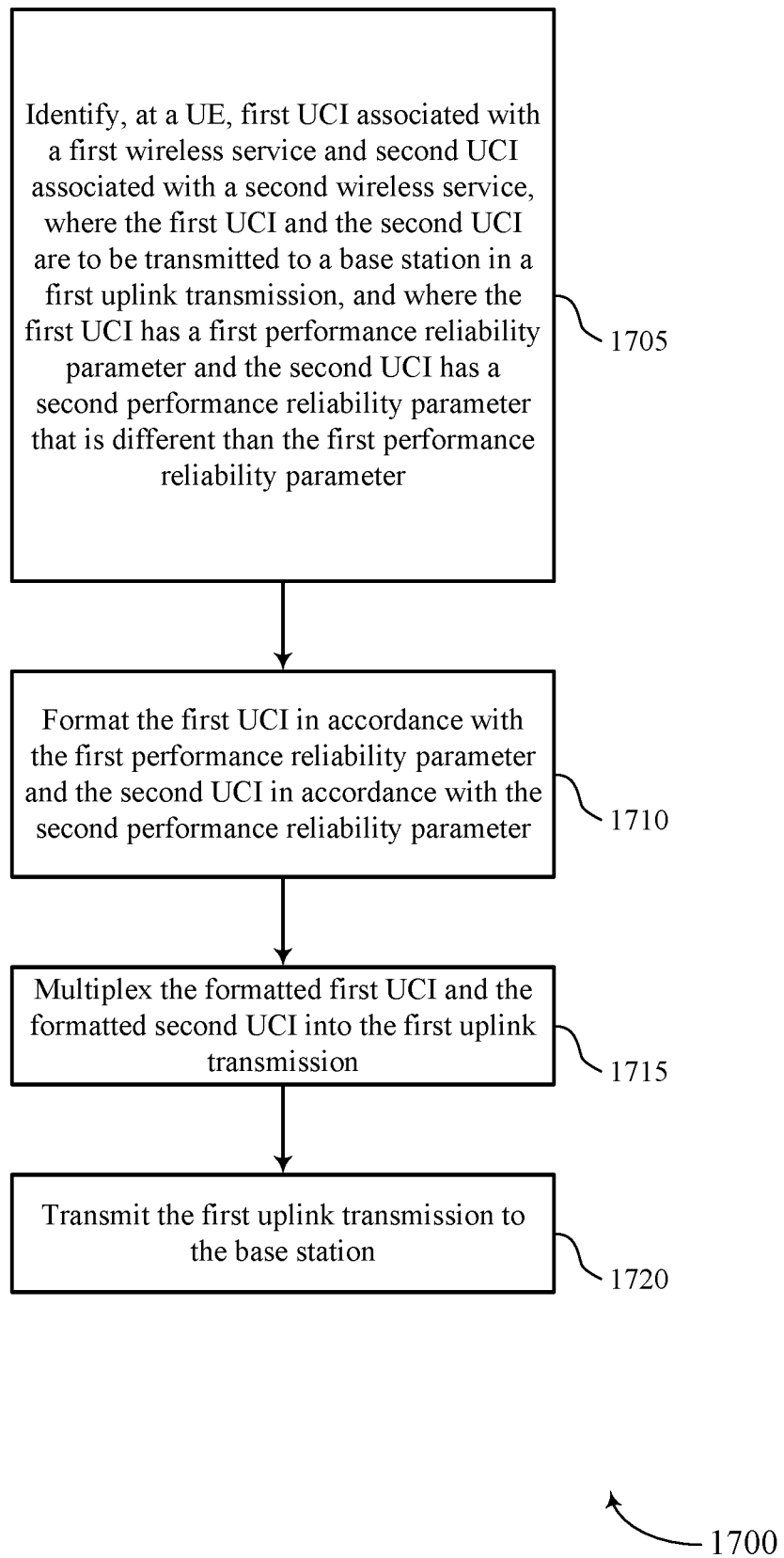

FIG. 17 shows a flowchart illustrating a method 1700 for control and data multiplexing in uplink wireless transmissions in accordance with aspects of the present disclosure. The operations of method 1700 may be implemented by a UE 115 or its components as described herein. For example, the operations of method 1700 may be performed by a UE communications manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At block 1705 the UE 115 may identify first UCI associated with a first wireless service and second UCI associated with a second wireless service, wherein the first UCI and the second UCI are to be transmitted to a base station in a first uplink transmission, and wherein the first UCI has a first performance reliability parameter and the second UCI has a second performance reliability parameter that is different than the first performance reliability parameter. The operations of block 1705 may be performed according to the methods described herein. In certain examples, aspects of the operations of block 1705 may be performed by a wireless service manager as described with reference to FIGS. 6 through 9.

At block 1710 the UE 115 may format the first UCI in accordance with the first performance reliability parameter and the second UCI in accordance with the second performance reliability parameter. The operations of block 1710 may be performed according to the methods described herein. In certain examples, aspects of the operations of block 1710 may be performed by a UCI manager as described with reference to FIGS. 6 through 9.

At block 1715 the UE 115 may multiplex the formatted first UCI and the formatted second UCI into the first uplink transmission. The operations of block 1715 may be performed according to the methods described herein. In certain examples, aspects of the operations of block 1715 may be performed by a UCI manager as described with reference to FIGS. 6 through 9.

At block 1720 the UE 115 may transmit the first uplink transmission to the base station. The operations of block 1720 may be performed according to the methods described herein. In certain examples, aspects of the operations of block 1720 may be performed by a uplink transmission manager as described with reference to FIGS. 6 through 9.

Figure 18:
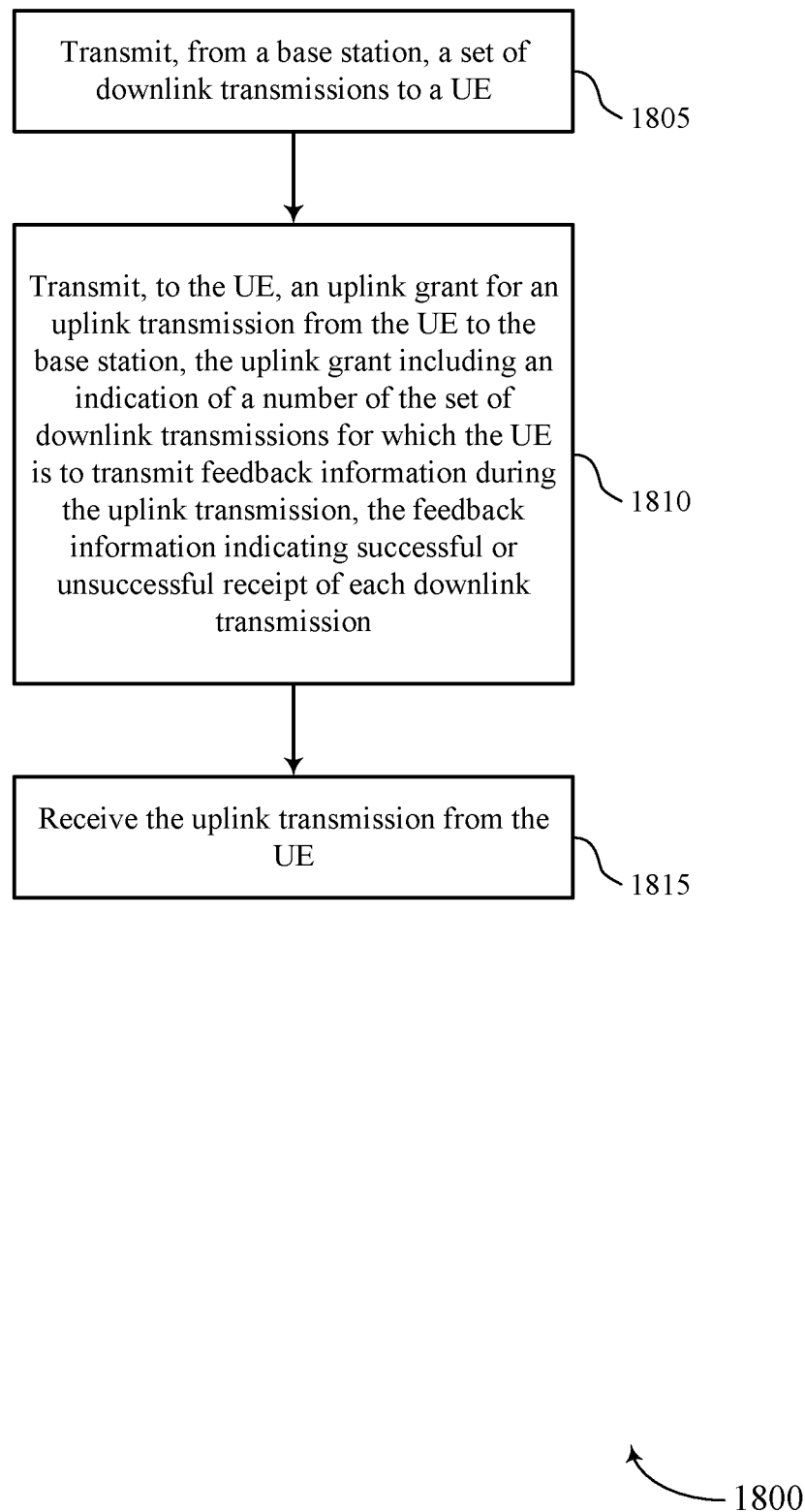

FIG. 18 shows a flowchart illustrating a method 1800 for control and data multiplexing in uplink wireless transmissions in accordance with aspects of the present disclosure. The operations of method 1800 may be implemented by a base station 105 or its components as described herein. For example, the operations of method 1800 may be performed by a base station communications manager as described with reference to FIGS. 10 through 13. In some examples, a base station 105 may execute a set of codes to control the functional elements of the device to perform the functions described below. Additionally or alternatively, the base station 105 may perform aspects of the functions described below using special-purpose hardware.

At block 1805 the base station 105 may transmit a plurality of downlink transmissions to a UE. The operations of block 1805 may be performed according to the methods described herein. In certain examples, aspects of the operations of block 1805 may be performed by a downlink transmission manager as described with reference to FIGS. 10 through 13.

At block 1810 the base station 105 may transmit, to the UE, an uplink grant for an uplink transmission from the UE to the base station, the uplink grant comprising an indication of a number of the plurality of downlink transmissions for which the UE is to transmit feedback information during the uplink transmission, the feedback information indicating successful or unsuccessful receipt of each downlink transmission. The operations of block 1810 may be performed according to the methods described herein. In certain examples, aspects of the operations of block 1810 may be performed by a uplink transmission manager as described with reference to FIGS. 10 through 13.

At block 1815 the base station 105 may receive the uplink transmission from the UE. The operations of block 1815 may be performed according to the methods described herein. In certain examples, aspects of the operations of block 1815 may be performed by a uplink transmission manager as described with reference to FIGS. 10 through 13.

Figure 19:
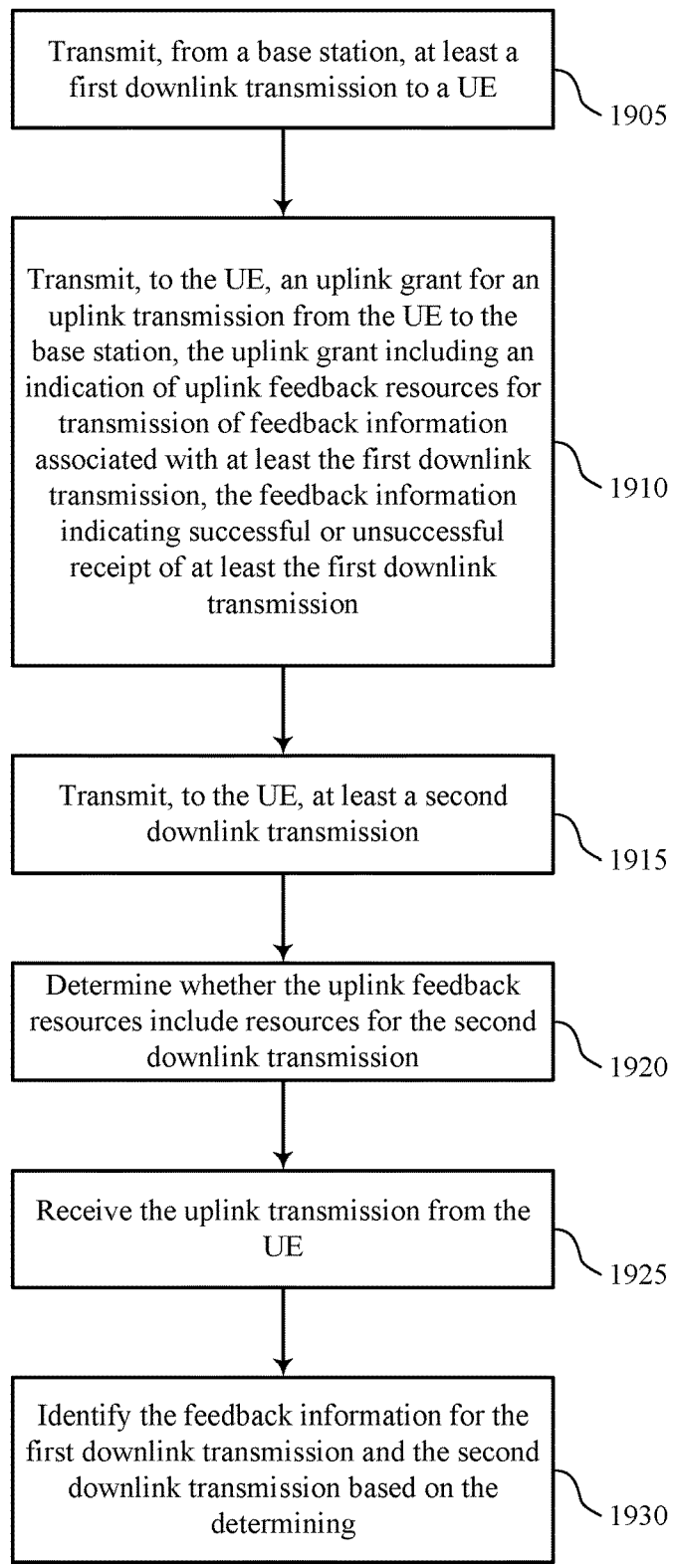

FIG. 19 shows a flowchart illustrating a method 1900 for control and data multiplexing in uplink wireless transmissions in accordance with aspects of the present disclosure. The operations of method 1900 may be implemented by a base station 105 or its components as described herein. For example, the operations of method 1900 may be performed by a base station communications manager as described with reference to FIGS. 10 through 13. In some examples, a base station 105 may execute a set of codes to control the functional elements of the device to perform the functions described below. Additionally or alternatively, the base station 105 may perform aspects of the functions described below using special-purpose hardware.

At block 1905 the base station 105 may transmit at least a first downlink transmission to a UE. The operations of block 1905 may be performed according to the methods described herein. In certain examples, aspects of the operations of block 1905 may be performed by a downlink transmission manager as described with reference to FIGS. 10 through 13.

At block 1910 the base station 105 may transmit, to the UE, an uplink grant for an uplink transmission from the UE to the base station, the uplink grant comprising an indication of uplink feedback resources for transmission of feedback information associated with at least the first downlink transmission, the feedback information indicating successful or unsuccessful receipt of at least the first downlink transmission. The operations of block 1910 may be performed according to the methods described herein. In certain examples, aspects of the operations of block 1910 may be performed by a uplink transmission manager as described with reference to FIGS. 10 through 13.

At block 1915 the base station 105 may transmit, to the UE, at least a second downlink transmission. The operations of block 1915 may be performed according to the methods described herein. In certain examples, aspects of the operations of block 1915 may be performed by a downlink transmission manager as described with reference to FIGS. 10 through 13.

At block 1920 the base station 105 may determine whether the uplink feedback resources include resources for the second downlink transmission. The operations of block 1920 may be performed according to the methods described herein. In certain examples, aspects of the operations of block 1920 may be performed by a feedback manager as described with reference to FIGS. 10 through 13.

At block 1925 the base station 105 may receive the uplink transmission from the UE. The operations of block 1925 may be performed according to the methods described herein. In certain examples, aspects of the operations of block 1925 may be performed by a uplink transmission manager as described with reference to FIGS. 10 through 13.

At block 1930 the base station 105 may identify the feedback information for the first downlink transmission and the second downlink transmission based at least in part on the determining. The operations of block 1930 may be performed according to the methods described herein. In certain examples, aspects of the operations of block 1930 may be performed by a feedback manager as described with reference to FIGS. 10 through 13.

Figure 20:
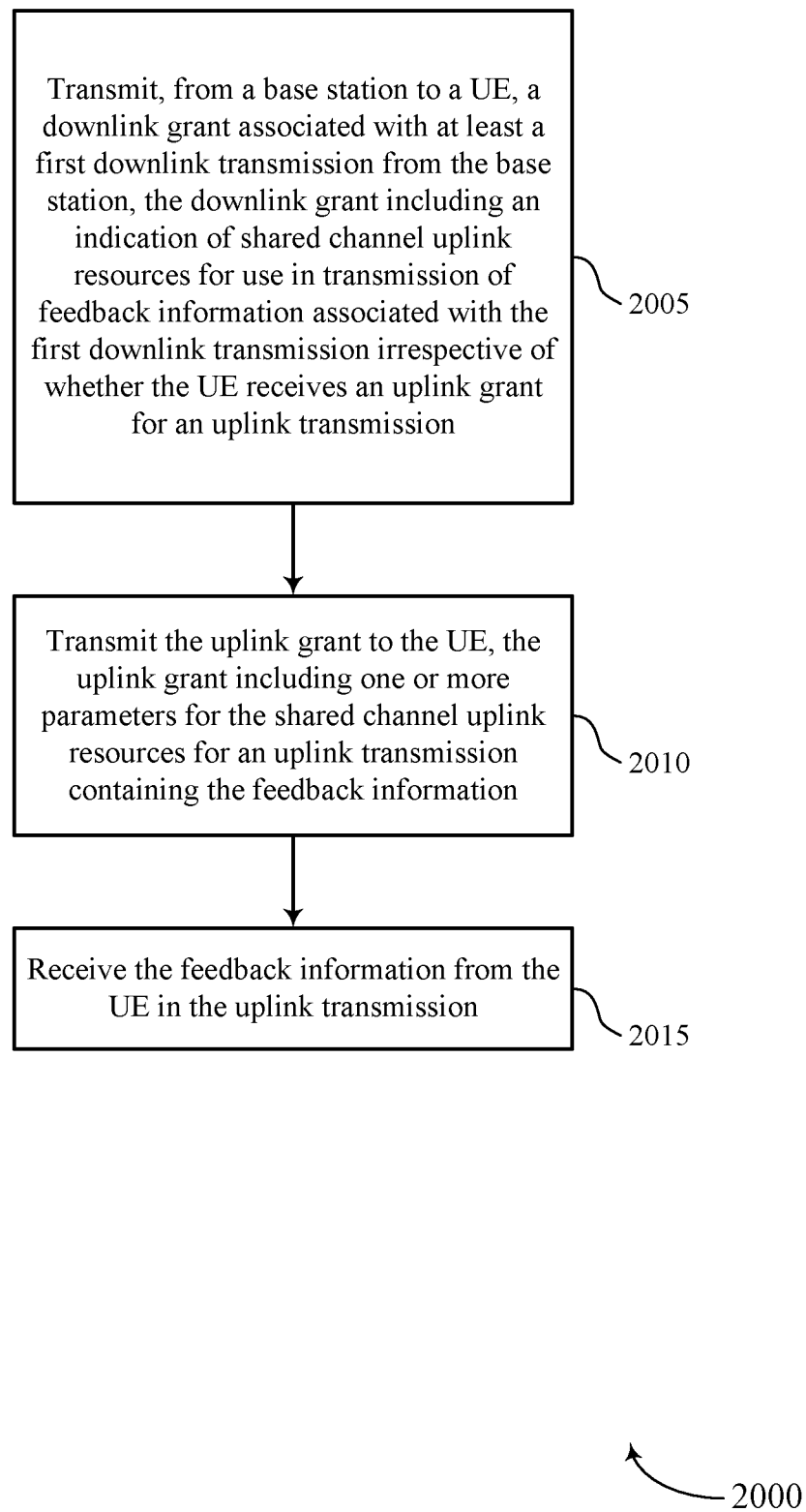

FIG. 20 shows a flowchart illustrating a method 2000 for control and data multiplexing in uplink wireless transmissions in accordance with aspects of the present disclosure. The operations of method 2000 may be implemented by a base station 105 or its components as described herein. For example, the operations of method 2000 may be performed by a base station communications manager as described with reference to FIGS. 10 through 13. In some examples, a base station 105 may execute a set of codes to control the functional elements of the device to perform the functions described below. Additionally or alternatively, the base station 105 may perform aspects of the functions described below using special-purpose hardware.

At block 2005 the base station 105 may transmit to a UE, a downlink grant associated with at least a first downlink transmission from the base station, the downlink grant comprising an indication of shared channel uplink resources for use in transmission of feedback information associated with the first downlink transmission irrespective of whether the UE receives an uplink grant for an uplink transmission. The operations of block 2005 may be performed according to the methods described herein. In certain examples, aspects of the operations of block 2005 may be performed by a downlink transmission manager as described with reference to FIGS. 10 through 13.

At block 2010 the base station 105 may transmit the uplink grant to the UE, the uplink grant comprising one or more parameters for the shared channel uplink resources for an uplink transmission containing the feedback information. The operations of block 2010 may be performed according to the methods described herein. In certain examples, aspects of the operations of block 2010 may be performed by a downlink transmission manager as described with reference to FIGS. 10 through 13.

At block 2015 the base station 105 may receive the feedback information from the UE in the uplink transmission. The operations of block 2015 may be performed according to the methods described herein. In certain examples, aspects of the operations of block 2015 may be performed by a uplink transmission manager as described with reference to FIGS. 10 through 13.

Figure 21:
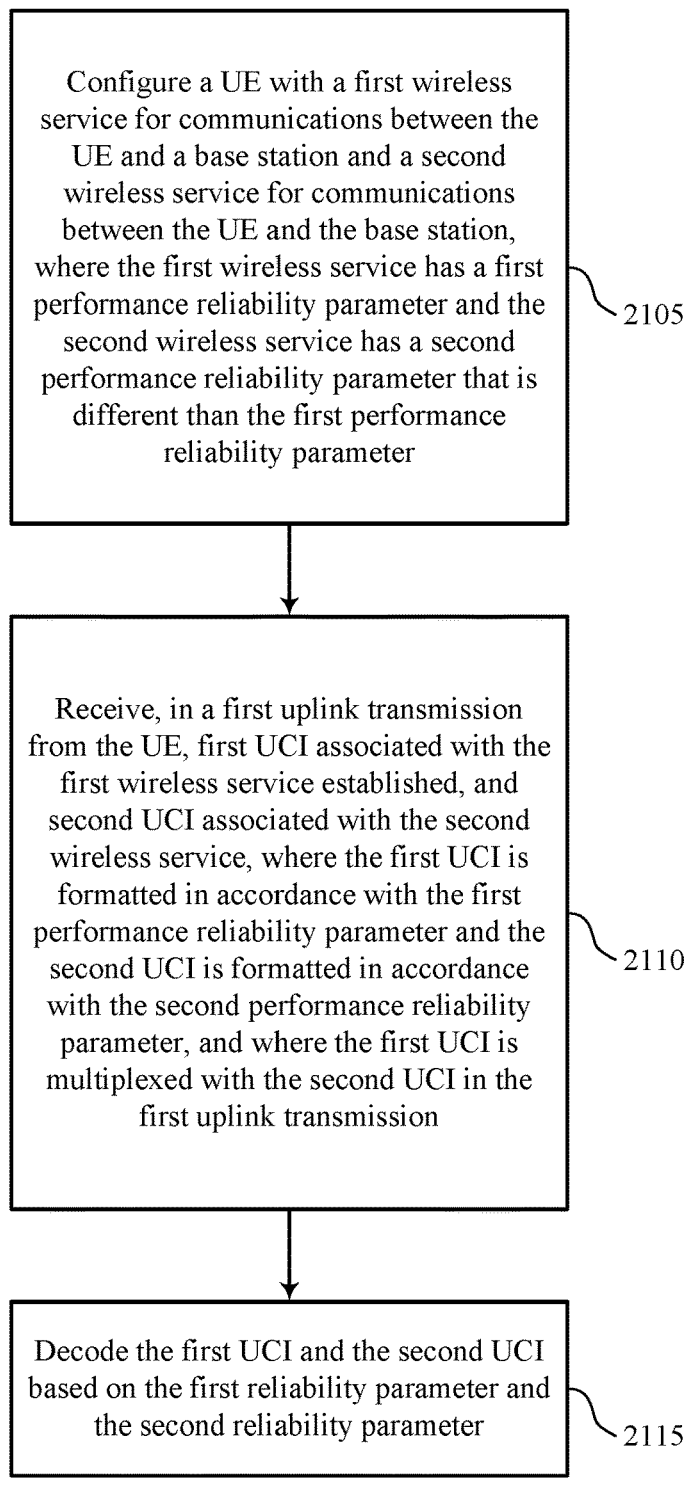

FIG. 21 shows a flowchart illustrating a method 2100 for control and data multiplexing in uplink wireless transmissions in accordance with aspects of the present disclosure. The operations of method 2100 may be implemented by a base station 105 or its components as described herein. For example, the operations of method 2100 may be performed by a base station communications manager as described with reference to FIGS. 10 through 13. In some examples, a base station 105 may execute a set of codes to control the functional elements of the device to perform the functions described below. Additionally or alternatively, the base station 105 may perform aspects of the functions described below using special-purpose hardware.

At block 2105 the base station 105 may configure a UE with a first wireless service for communications between the UE and a base station and a second wireless service for communications between the UE and the base station, wherein the first wireless service has a first performance reliability parameter and the second wireless service has a second performance reliability parameter that is different than the first performance reliability parameter. The operations of block 2105 may be performed according to the methods described herein. In certain examples, aspects of the operations of block 2105 may be performed by a wireless service manager as described with reference to FIGS. 10 through 13.

At block 2110 the base station 105 may receive, in a first uplink transmission from the UE, first UCI associated with the first wireless service established, and second UCI associated with the second wireless service, wherein the first UCI is formatted in accordance with the first performance reliability parameter and the second UCI is formatted in accordance with the second performance reliability parameter, and wherein the first UCI is multiplexed with the second UCI in the first uplink transmission. The operations of block 2110 may be performed according to the methods described herein. In certain examples, aspects of the operations of block 2110 may be performed by a uplink transmission manager as described with reference to FIGS. 10 through 13.

At block 2115 the base station 105 may decode the first UCI and the second UCI based at least in part on the first reliability parameter and the second reliability parameter. The operations of block 2115 may be performed according to the methods described herein. In certain examples, aspects of the operations of block 2115 may be performed by a wireless service manager as described with reference to FIGS. 10 through 13.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates an inclusive list such that, for example, a phrase referring to "at least one of" a list of items refers to any combination of those items, including single members. As an example, "at least one of: A, B, or C" is intended to cover A, B, C, A-B, A-C, B-C, and A-B-C, as well as any combination with multiples of the same element (e.g., A-A, A-A-A, A-A-B, A-A-C, A-B-B, A-C-C, B-B, B-B-B, B-B-C, C-C, and C-C-C or any other ordering of A, B, and C).

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication performed by a user equipment (UE), comprising:
   receiving, from a network entity, one or more downlink grants scheduling a set of downlink transmissions;
   receiving, from the network entity, a single uplink grant that schedules uplink resources for a physical uplink shared channel (PUSCH) to be transmitted by the UE to the network entity, the uplink grant comprising a field indicating a number of downlink transmissions for which the UE is to transmit feedback information in the PUSCH
   receiving, from the network entity, a subsequent downlink grant after receiving the single uplink grant, the subsequent downlink grant scheduling another downlink transmission that is not in the set of downlink transmissions and that has a higher priority than the set of downlink transmissions, the scheduled uplink resources for the PUSCH not including uplink resources for the other downlink transmission;
   receiving, from the network entity, a plurality of downlink transmissions including one or more of the set of downlink transmissions and including the other downlink transmission;
   generating the feedback information based on the reception of the plurality of downlink transmissions, the feedback information including:
      a first indication, for each received downlink transmission of the plurality of downlink transmissions, of whether the downlink transmission was successfully received or unsuccessfully received, and
      based on the number of downlink transmissions for which the UE is to transmit feedback information in the PUSCH being greater than the number of received downlink transmissions in the plurality of downlink transmissions, a second indication, for each of one or more missed downlink transmissions of the set of downlink transmissions, that the downlink transmission was not received;
   rate-matching uplink data around the feedback information in the PUSCH based on the indication of the number of downlink transmissions for which the UE is to transmit feedback information; and
   transmitting the PUSCH to the network entity.

2. The method of claim 1, wherein:
   the indication of the number of downlink transmissions for which the UE is to transmit feedback information in the PUSCH is indicated in a downlink assignment index (DAI) transmitted in the uplink grant.

3. The method of claim 1, wherein:
   the uplink grant further comprises a grant of uplink feedback resources for transmission of the feedback information associated with the plurality of downlink transmissions, and wherein the method further comprises;
   determining whether the uplink feedback resources include resources for feedback for each of the plurality of downlink transmissions; and
   puncturing a portion of the PUSCH that is outside of the uplink feedback resources with feedback information for at least a first downlink transmission of the plurality of downlink transmissions based at least in part on determining that the uplink feedback resources do not include resources for feedback for the first downlink transmission.

4. A method for wireless communication performed by a base station, comprising:
   transmitting, to a user equipment (UE), one or more downlink grants scheduling a set of downlink transmissions;
   transmitting, to the UE, a single uplink grant that schedules uplink resources for a physical uplink shared channel (PUSCH) to be transmitted by the UE to the network entity, the uplink grant comprising a field indicating a number of downlink transmissions for which the UE is to transmit feedback information in the PUSCH;
   transmitting, to the UE, a subsequent downlink grant after transmitting the single uplink grant, the subsequent downlink grant scheduling another downlink transmission that is not in the set of downlink transmissions and that has a higher priority than the set of downlink transmissions, the scheduled uplink resources for the PUSCH not including uplink resources for the other downlink transmission;
   transmitting, to the UE, the set of downlink transmissions and the other downlink transmission; and
   receiving the PUSCH from the UE, the PUSCH including the feedback information and uplink data rate-matched around the feedback information, the rate-matching being based on indication of the number of downlink transmissions for which the UE is to transmit feedback information;
   wherein the feedback information includes:
      a first indication, for each downlink transmission received by the UE, of whether the downlink transmission was successfully received or unsuccessfully received, and
      based on the number of downlink transmissions for which the UE is to transmit feedback information in the PUSCH being greater than the number of downlink transmissions received by the UE, a second indication, for each of one or more missed downlink transmissions of the set of downlink transmissions, that the downlink transmission was not received.

5. The method of claim 4, wherein:
the indication of the number of downlink transmissions for which the UE is to transmit feedback information in the PUSCH is indicated in a downlink assignment index (DAI) transmitted in the uplink grant.

6. A user equipment (UE) comprising:
a processor;
memory in electronic communication with the processor; and
instructions stored in the memory and operable, when executed by the processor, to cause the apparatus to:
receive, from a network entity, one or more downlink grants scheduling a set of downlink transmissions;
receive, from the network entity, a single uplink grant that schedules uplink resources for a physical uplink shared channel (PUSCH) to be transmitted by the UE to the network entity, the uplink grant comprising a field indicating a number of downlink transmissions for which the UE is to transmit feedback information in the PUSCH;
receive, from the network entity, a subsequent downlink grant after receiving the single uplink grant, the subsequent downlink grant scheduling another downlink transmission that is not in the set of downlink transmissions and that has a higher priority than the set of downlink transmissions, the scheduled uplink resources for the PUSCH not including uplink resources for the other downlink transmission;
receive, from the network entity, a plurality of downlink transmissions including one or more of the set of downlink transmissions and including the other downlink transmission;
generate the feedback information based on the reception of the plurality of downlink transmissions, the feedback information including:
a first indication, for each received downlink transmission of the plurality of downlink transmissions, of whether the downlink transmission was successfully received or unsuccessfully received, and
based on the number of downlink transmissions for which the UE is to transmit feedback information in the PUSCH being greater than the number of received downlink transmissions in the plurality of downlink transmissions, a second indication, for each of one or more missed downlink transmissions of the set of downlink transmissions, that the downlink transmission was not received;
rate-match uplink data around the feedback information in the PUSCH based on the indication of the number of downlink transmissions for which the UE is to transmit feedback information; and
transmit the PUSCH to the network entity.

7. The UE of claim 6, wherein:
the indication of the number of downlink transmissions for which the UE is to transmit feedback information in the PUSCH is indicated in a downlink assignment index (DAI) transmitted in the uplink grant.

8. The UE of claim 6, wherein:
the uplink grant further comprises a grant of uplink feedback resources for transmission of the feedback information associated with the plurality of downlink transmissions, and wherein the method further comprises:

determining whether the uplink feedback resources include resources for feedback for each of the plurality of downlink transmissions; and
puncturing a portion of the PUSCH that is outside of the uplink feedback resources with feedback information for at least a first downlink transmission of the plurality of downlink transmissions based at least in part on determining that the uplink feedback resources do not include resources for feedback for the first downlink transmission.

9. A base station comprising:
a processor;
memory in electronic communication with the processor; and
instructions stored in the memory and operable, when executed by the processor, to cause the apparatus to:
transmit, to a user equipment (UE), one or more downlink grants scheduling a set of downlink transmissions;
transmit, to the UE, a single uplink grant that schedules uplink resources for a physical uplink shared channel (PUSCH) to be transmitted by the UE to the network entity, the uplink grant comprising a field indicating a number of downlink transmissions for which the UE is to transmit feedback information in the PUSCH;
transmit, to the UE, a subsequent downlink grant after transmitting the single uplink grant, the subsequent downlink grant scheduling another downlink transmission that is not in the set of downlink transmissions and that has a higher priority than the set of downlink transmissions, the scheduled uplink resources for the PUSCH not including uplink resources for the other downlink transmission;
transmit, to the UE, the set of downlink transmissions and the other downlink transmission; and
receive the PUSCH from the UE, the PUSCH including the feedback information and uplink data rate-matched around the feedback information, the rate-matching being based on indication of the number of downlink transmissions for which the UE is to transmit feedback information;
wherein the feedback information includes:
a first indication, for each downlink transmission received by the UE, of whether the downlink transmission was successfully received or unsuccessfully received, and
based on the number of downlink transmissions for which the UE is to transmit feedback information in the PUSCH being greater than the number of downlink transmissions received by the UE, a second indication, for each of one or more missed downlink transmissions of the set of downlink transmissions, that the downlink transmission was not received.

10. The base station of claim 9, wherein:
the indication of the number of downlink transmissions for which the UE is to transmit feedback information in the PUSCH is indicated in a downlink assignment index (DAI) transmitted in the uplink grant.

* * * * *